(12) United States Patent
Akahane

(10) Patent No.: US 7,965,715 B2
(45) Date of Patent: Jun. 21, 2011

(54) RELAY DEVICE AND RELAY DEVICE CONTROLLING METHOD

(75) Inventor: Shinichi Akahane, Hachioji (JP)

(73) Assignee: ALAXALA Networks Corporation, Kanagawa (JP)

( * ) Notice: Subject to any disclaimer, the term of this patent is extended or adjusted under 35 U.S.C. 154(b) by 381 days.

(21) Appl. No.: 12/323,612

(22) Filed: Nov. 26, 2008

(65) Prior Publication Data

US 2009/0180477 A1 Jul. 16, 2009

(30) Foreign Application Priority Data

Jan. 10, 2008 (JP) ................................ 2008-002738

(51) Int. Cl.
*H04L 12/28* (2006.01)
*H04L 12/56* (2006.01)
(52) U.S. Cl. ... 370/392; 370/260; 370/389; 370/395.42; 370/400
(58) Field of Classification Search .................. 370/392, 370/385.42, 400
See application file for complete search history.

(56) References Cited

U.S. PATENT DOCUMENTS

2005/0243861 A1* 11/2005 Elkayam et al. .............. 370/466
2006/0133368 A1* 6/2006 Tolliver ......................... 370/389
2006/0277346 A1* 12/2006 Doak et al. .................... 710/305
2008/0294917 A1* 11/2008 Khan et al. ................... 713/310

FOREIGN PATENT DOCUMENTS

| JP | 2000-201166 | 7/2000 |
| JP | 2005-123715 | 5/2005 |
| JP | 2007-228490 | 9/2007 |
| JP | 2007-228491 | 9/2007 |

* cited by examiner

*Primary Examiner* — Pankaj Kumar
*Assistant Examiner* — Lonnie Sweet
(74) *Attorney, Agent, or Firm* — Antonelli, Terry, Stout & Kraus, LLP.

(57) ABSTRACT

In the first power mode: each packet processor of the second group maintains own operating mode in a first operating mode of relatively low power consumption; and the distributor selects the handling packet processor from the first group for the first priority, and selects the handling packet processor from at least one group excluding the second group for the second priority.

In the second power mode: each packet processor of the second group maintains the own operating mode in a second operating mode of relatively high power consumption; and the distributor selects the handling packet processor from the first group for the first priority, and selects the handling packet processor from at least one group including the second group for the second priority.

12 Claims, 17 Drawing Sheets

FRAME STRUCTURE

LAYER 2 HEADER (UNTAGGED)

LAYER 2 HEADER (TAGGED)

LAYER 3 HEADER (IPv4)

LAYER 3 HEADER (IPv6)

LAYERED 4 HEADER (TCP)

LAYER 4 HEADER (UDP)

Fig.4

PRIORITY TABLE 334

| | CONDITION | | | | | PROCESSING PRIORITY |
|---|---|---|---|---|---|---|
| L2 HEADER INFORMATION | | | L3 HEADER INFORMATION | | L4 HEADER INFORMATION | |
| VLAN ID | URPI | OTHER | TOS | OTHER | | |
| VLAN1 | 0 | * | 0 | * | * | PRI_0 (LOW) |
| VLAN1 | 2 | * | 2 | * | * | PRI_1(HIGH) |
| VLAN2 | * | * | * | * | * | PRI_1(HIGH) |
| ... | ... | ... | ... | ... | ... | ... |

R1 → (row 1)
R2 → (row 2)
R3 → (row 3)

Fig.5

STATISTICAL INFORMATION TABLE 332

| PROCESSING PRIORITY | STATISTICAL INFORMATION | | | | | UPPER LIMIT THRESHOLD VALUE | LOWER LIMIT THRESHOLD VALUE |
|---|---|---|---|---|---|---|---|
| | CUMULATIVE NUMBER OF FRAMES | CUMULATIVE NUMBER OF BYTES | PREVIOUS ARRIVAL TIME | NUMBER OF FRAMES/SEC | NUMBER OF BYTES/SEC | | |
| PRI_0(LOW) | 200,000,000 | 30,000,000,000 B | 10sec | 100 packets/sec | 10000 B/sec | TU_0 | TL_0 |
| PRI_1(HIGH) | 1,000,000,000 | 200,000,000,000 B | 11sec | 1000 packets/sec | 100000 B/sec | TU_1 | TL_1 |
| PRI_0+PRI_1 (LOW + HIGH) | 1,200,000,000 | 230,000,000,000 B | 10sec | 1100 packets/sec | 110000 B/sec | TU_e | TL_e |
| ... | ... | ... | ... | ... | ... | ... | ... |

LD0, LD1, LDe

Fig.6

DISTRIBUTION TABLE 342 (FIRST POWER MODE)

| PROCESSING PRIORITY | DISTRIBUTION FRAME PROCESSOR LIST |
|---|---|
| PRI_0(LOW) | 1 ··· k (PG1) |
| PRI_1(HIGH) | 1 ··· k (PG1) |
| ··· | ··· |

Fig.7

DISTRIBUTION TABLE 342 (SECOND POWER MODE)

| PROCESSING PRIORITY | DISTRIBUTION FRAME PROCESSOR LIST |
|---|---|
| PRI_0(LOW) | k+1 ··· N (PG2) |
| PRI_1(HIGH) | 1 ··· k (PG1) |
| ··· | ··· |

CONTROL INFORMATION TABLE 122

EMBODIMENT 1

RELAY DEVICE AND RELAY DEVICE CONTROLLING METHOD

CROSS-REFERENCE TO RELATED APPLICATIONS

The present application claims the priority based on Japanese Patent Application No. 2008-2738 filed on Jan. 10, 2008, the disclosure of which is hereby incorporated by reference in its entirety.

BACKGROUND

1. Technical Field

The present invention relates to a relay device and to a method of controlling the relay device.

2. Description of the Related Art

Networks including relay devices such as switches and routers have been in use. Recent years have seen dramatic improvements in relay device performances, in order to accommodate larger network scale and increased data traffic. There has been a tendency for the power consumed by the relay devices to increase in accordance with the improved performance Meanwhile, among devices that are connected to networks, there are known devices that can operate in normal operating modes and power saving modes.

SUMMARY

Concerning devices operable in a plurality of power modes with different power consumption levels, the performance in the power mode with low power consumption will be less than the performance in the power mode with high power consumption. Often the reduction in performance in the relay device has led to a reduction in the reliability of the data relay. Note that there has been inadequate innovation in regards to controlling both the reliability of the data relay and the power consumption.

An advantage of some aspects of the invention is to provide a technology capable of controlling both the reliability of the data relay and the power consumption.

According to a first aspect of the invention, there is provided a relay device for relaying packets. The relay device includes a plurality of ports, a priority determination module, N (the number N is an integer at least 2) packet processors, and a distributor. The plurality of ports are configured to connect to lines and include J (the number J is an integer at least 1) target ports utilized for forwarding according to priority. The priority determination module determines the priority for each of received packets received by the target ports, from among K (the number K is an integer at least 2) priority levels including a first priority and a second priority. The N packet processors control forwarding of the received packet among the ports. The distributor selects an handling packet processor to control forwarding of the received packet from among the N packet processors for each of the received packets. The N packet processors are grouped into P (the number P is an integer at least 2) groups including a first group and a second group. The relay device is configured to selects a power mode of the relay device from among a plurality of power modes including a first power mode and a second power mode.

In the first power mode: each packet processor of the second group maintains own operating mode in a first operating mode of relatively low power consumption; and the distributor selects the handling packet processor from the first group for the first priority, and selects the handling packet processor from at least one group excluding the second group for the second priority.

In the second power mode: each packet processor of the second group maintains the own operating mode in a second operating mode of relatively high power consumption; and the distributor selects the handling packet processor from the first group for the first priority, and selects the handling packet processor from at least one group including the second group for the second priority.

According to this arrangement, since it is possible to use the first power mode and the second power mode associated with different levels of power consumption by the second group, power consumption can be controlled. Further, between the first and the second power modes, the second priority-handling packet processor will be switched without switching the first priority-handling packet processor. As a result, reliability in first priority data relay can take priority over reliability in second priority data relay. By so doing, both power consumption and reliability of data relay can be controlled.

It is possible for the invention be embodied in various ways, for example, a packet relay method and device; a computer program for accomplishing the functions of such a method or device; or a recording medium having such a computer program recorded thereon.

These and other objects, features, aspects, and advantages of the present invention will become more apparent from the following detailed description of the preferred embodiments with the accompanying drawings.

BRIEF DESCRIPTION OF THE DRAWINGS

FIG. 4 is an illustration of a priority table 334.

FIG. 5 is an illustration of a statistical information table 332.

FIG. 6 is an illustration of a distribution table 342 utilized in a first power mode.

FIG. 7 is an illustration of a distribution table 342 utilized in a second power mode.

DESCRIPTION OF THE PREFERRED EMBODIMENT

The embodiments of the invention will be described below, in the indicated order.
A. Embodiment 1:
B. Embodiment 2:
C. Embodiment 3:
D. Embodiment 4:
E. Embodiment 5:
F. Embodiment 6:
G. Modified Embodiments:

A. Embodiment 1

Figure 1:
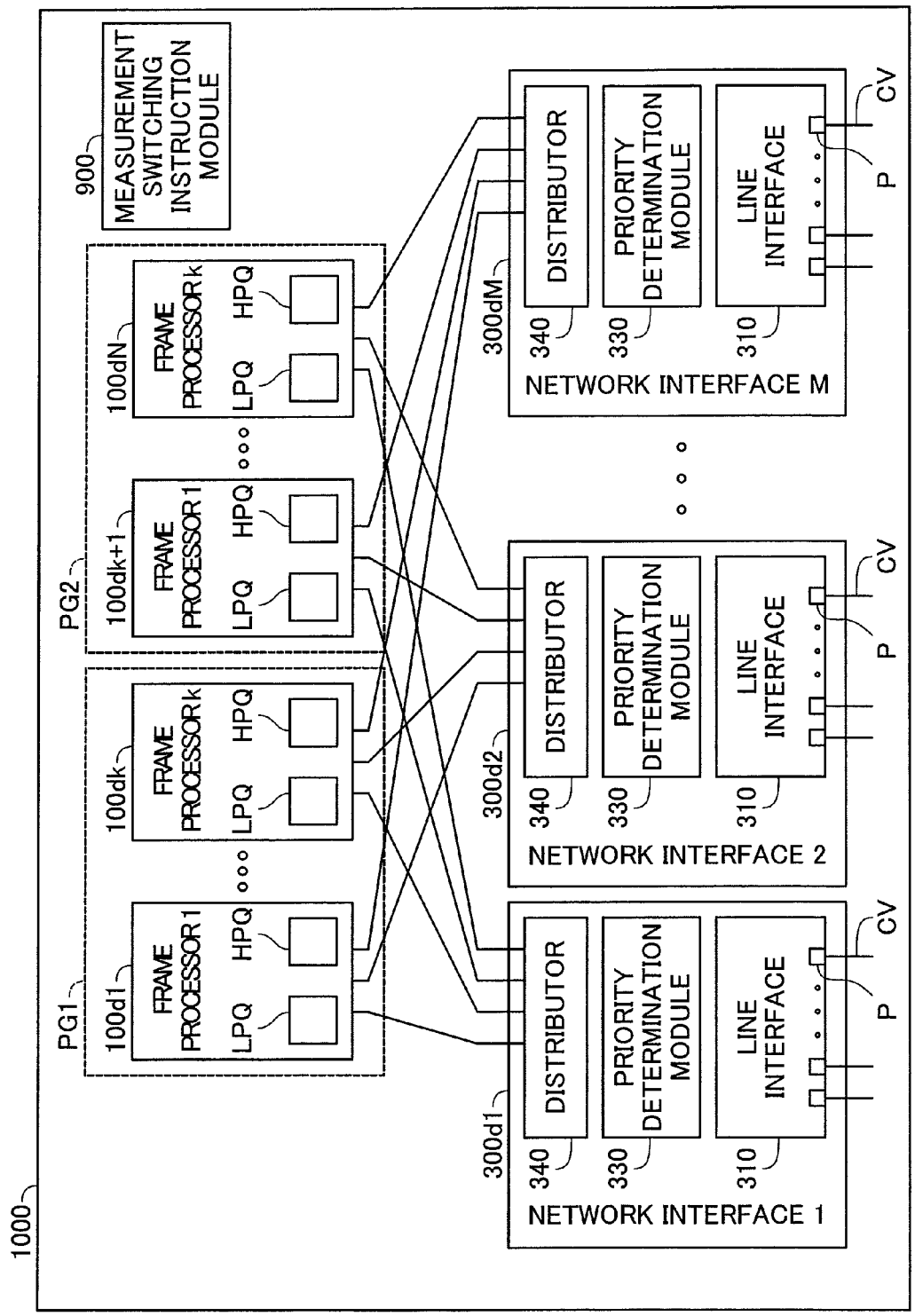
FIG. 1 is an illustration depicting a switching device 1000 as one embodiment.

FIG. 1 is an illustration depicting a switching device 1000 as one embodiment of the invention. This switching device 1000 operates as a so-called Layer 2 switch. Layer 2 corresponds to the second layer (the data link layer) in the OSI (Open System Interconnection) reference model.

The switching device 1000 includes a measurement switching instruction module 900; a number N (N is an integer at least 2) of frame processors 100d1 to 100dN; and a number M (M is an integer at least 2) of network interfaces 300d1 to 300dM.

The configurations of the frame processors 100d1 to 100dN are the same. The configurations of the network interfaces 300d1 to 300dM are also the same. Here, the suffix beginning with the letter "d" (e.g. "d1") of the reference characters for each of the frame processors 100d1 to 100dN and the network interfaces 300d1 to 300dM is characters identifying the individual module. Hereinbelow, the identifying characters will be omitted in instances where there is no need to distinguish among individual modules.

Each of the network interfaces 300 includes a plurality of physical ports P. The physical port P is a physical interface for connecting a line CV such as the coaxial cable or the optical fiber (e.g. the physical port compliant with the Ethernet (TM) standard). The network interface 300 analyzes electrical signals received through the physical ports P (lines CV) and acquires the frame data. The network interface 300 then provides the frame data to the frame processor 100. The frame data represents the unit of data transfer in the data link layer (hereinafter, the frame data is referred to simply as the "frame"). The unit of data transfer is also termed a packet.

The frame processor 100 analyzes the destination associated with the frame data (e.g. the destination MAC address), and identifies the physical port P associated with that destination. The relationships between the destinations and the physical ports P are established previously. The frame processor 100 then sends to the network interface 300 including the identified physical port P an instruction to transmit the frame data. In response to the instruction, the network interface 300 converts the frame data into electrical signals to transmit from the physical port P. In this way, the frame processor 100 controls forwarding (transfer) of the frame data (the packets) among physical ports P. Each frame processor 100 includes a high priority queue HPQ and a low priority queue LPQ. These queues HPQ, LPQ are utilized for the purpose of sequential processing of multiple packets (frame data) (discussed in detail later).

In the present embodiment, each of the N frame processors 100d1 to 100dN is respectively connected to each of the M network interfaces 300d1 to 300dM. That is, each of the frame processors 100d1 to 100dN is able to control forwarding of frame data in relation to all of the network interfaces 300d1 to 300dM. In the present embodiment, a handling frame processor selected from among the plurality of frame processors 100 controls forwarding of the frame data. The network interfaces 300 (distributors 340) select the handling frame processor for each individual packet (frame data).

In the present embodiment, the N frame processors 100d1 to 100dN are previously grouped into two groups PG1, PG2. The first group PG1 includes the first through k-th frame processors 100d1 to 100dk (k is an integer at least 1 and less than N). The second group PG2 includes the (k+1)-th to N-th frame processors 100dk+1 to 100dN. These groups PG1, PG are utilized in selection of the handling frame processors (discussed in detail later).

Figure 2:
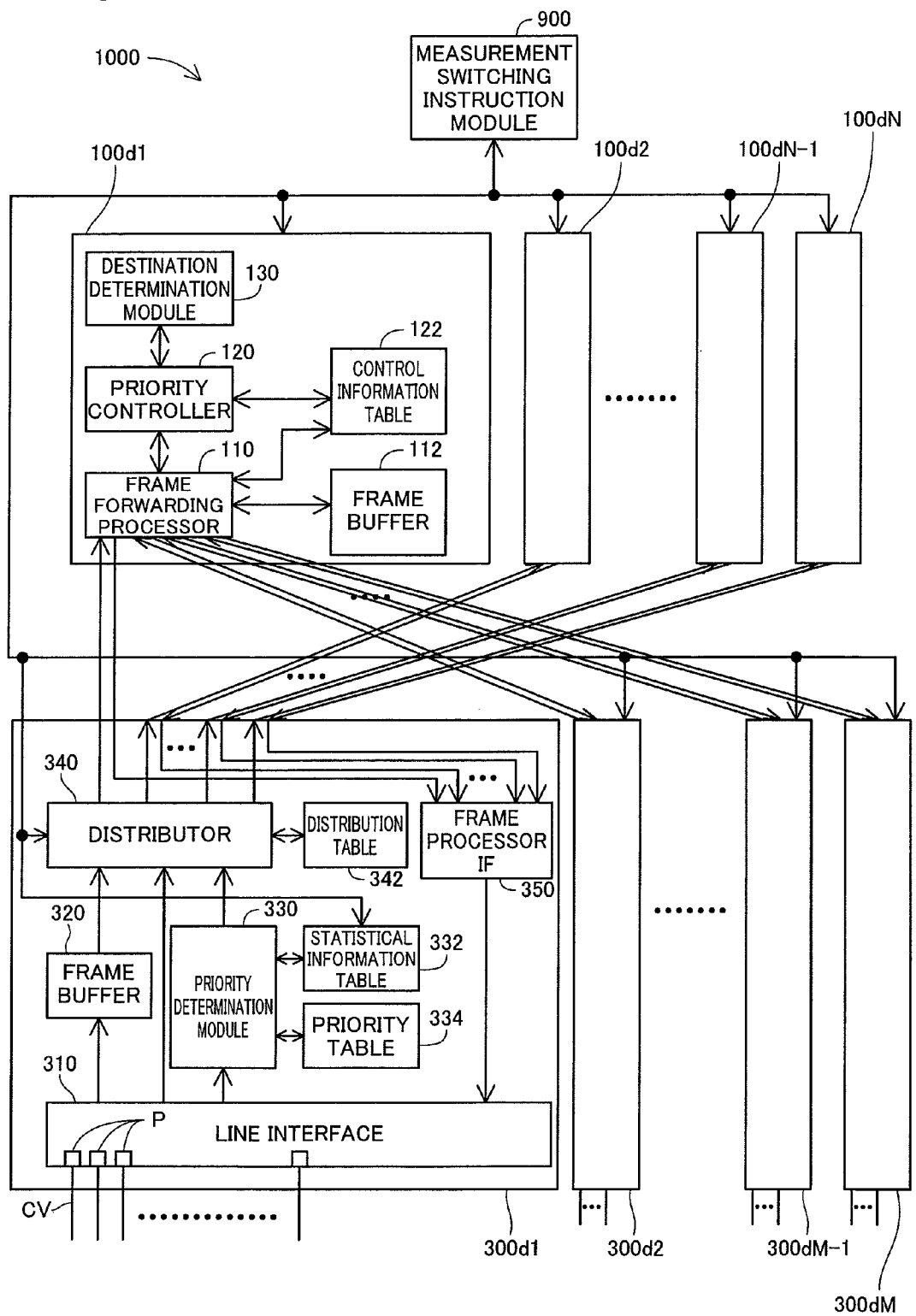
FIG. 2 is an illustration depicting a detailed configuration of the switching device 1000.

FIG. 2 is an illustration depicting a detailed configuration of the switching device 1000. FIG. 2 depicts the configuration of the frame processor 100d1. This configuration illustrates the common configuration of the N frame processors 100. The configuration of the network interface 300d1 is also depicted in FIG. 2. This configuration illustrates the common configuration of the M network interfaces 300.

Each network interface 300 includes a line interface 310, a frame buffer 320, a priority determination module 330, a statistical information table 332, a priority table 334, a distributor 340, a distribution table 342, and a frame processor interface 350. The tables 332, 334, and 342 are stored in memory (not shown). These elements of the network interface 300 can be realized through hardware circuitries (e.g. electronic circuitries such as the ASIC (Application Specific Integrated Circuit)).

The line interface 310 includes a plurality of physical ports P. The frame buffer 320 is a memory for temporarily storing the frame data received via the physical port P. The priority determination module 330 determines priority (hereinafter termed "processing priority") for each packet (frame data). The distributor 340 selects the handling frame processor on an individual frame data basis (for each packet) and sends the frame data to the handling frame processor. The distributor 340 selects the handling frame processor according to the processing priority (described in detail later).

Each frame processor 100 includes a frame forwarding processor 110, a frame buffer 112, a priority controller 120, a control information table 122, and a destination determination module 130. The control information table 122 is stored in memory (not shown). These elements of the frame processors 100 can be realized through hardware circuitries (e.g. electronic circuitries such as the ASIC).

The frame forwarding processor 110 carries out reception of the frame data from the network interface 300, and transmission of the frame data to the network interface 300. The frame buffer 112 is a memory for temporarily storing the frame data received from the network interface 300. The destination determination module 130 analyzes the destination associated with the frame data, and identifies the physical port P associated with that destination (hereinafter also termed the "destination physical port"). The frame forwarding processor 110 then supplies a transmit instruction including the frame data and information identifying the destination physical port to the network interface 300 including the destination physical port. The frame processor interface then supplies the transmit instruction to the line interface 310. In response to the transmit instruction, the line interface 310 transmits the frame data from the destination physical port.

In some instances, the network interface 300 may supply frame data to the frame processor 100 at a rate in excess of the processing speed of the destination determination module 130 (e.g. where there are many frames to be relayed). In such instances, multiple packets (frame data) waiting processing are stored in the frame buffer 112. The priority controller 120 determines the processing order for the frame data according to the processing priority of the frame data (discussed in detail later).

The measurement switching instruction module 900 switches operating modes of the frame processors 100 in accordance with the statistical information table 332. In the present embodiment, the frame processors 100 have a normal mode and a power saving mode. In the normal mode, the frame processor 100 is in the operational state and controls forwarding of the frame data. In the power saving mode, on the other hand, the frame processor 100 stops the power supply to part of the electronic circuitry in the frame processor 100 to stop the forwarding function. In this way, in the normal mode, the processing capability will be higher, and the power consumption will be greater, as compared with the power saving mode. Switching of the operating mode will be discussed in detail later. The measurement switching instruction module 900 may be realized through a hardware circuitry (e.g. an electronic circuitry such as the ASIC).

FIGS. 3A-3G are illustrations of the frame data. In the present embodiment, the frame data FD is the Ethernet frame. Typical Ethernet frame structure is depicted in FIGS. 3A-3G. The frame data FD includes the Layer 2 header H1, the Layer 3 header H2, the Layer 4 header H3, and data DT.

Figure 3A:
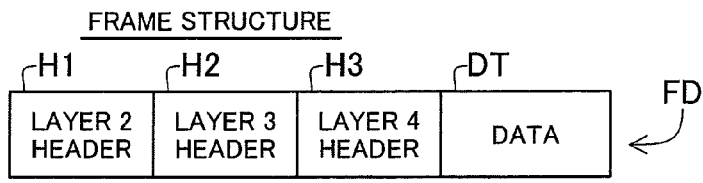
FIGS. 3A-3G are illustrations of frame data.
Figure 3B:
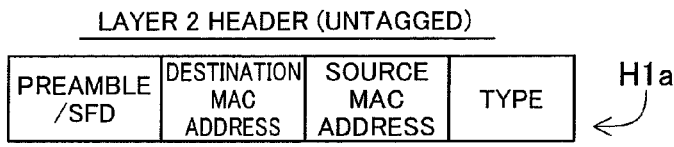
Figure 3C:
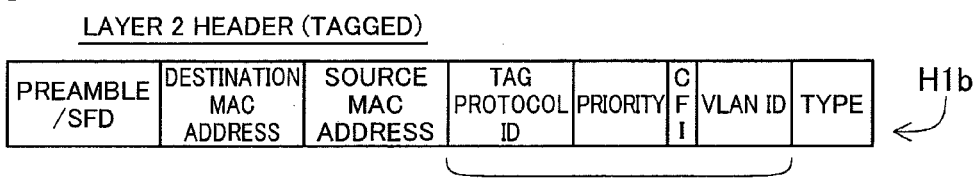

The Layer 2 header H1 is established according to the protocol of the second layer of the OSI reference model (the data link layer). In the present embodiment, two types of header, namely, an untagged header H1a and a tagged header H1b, are used as the Layer 2 header H1 (FIGS. 3B-3C). The untagged header H1a includes the destination MAC address field and the source MAC address field. The tagged header H1b is a header adapted for use in a so-called VLAN (Virtual Local Area Network). The tagged header H1b is equivalent to the untagged header H1a with an appended tag header TH for the VLAN. The tag header TH includes the VLAN-ID field and the user priority field. The VLAN-ID is the identifying number of the VLAN. The user priority indicates an order of priority of the frame data FD. The user priority is represented on three bits (eight levels from 0 to 7), with larger numbers associated with higher priority. In some instances, user priority may be set by the source (sender) device of the frame data FD (e.g. a personal computer). In other instances, the user priority may be set (overwritten) by the relay device that relays the frame data FD (e.g. a router).

Figure 3D:
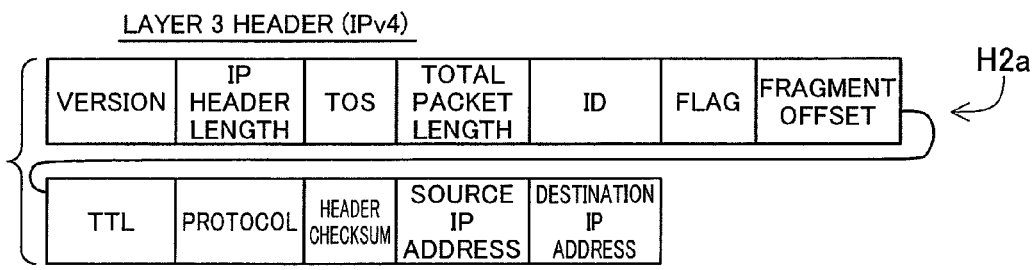
Figure 3E:
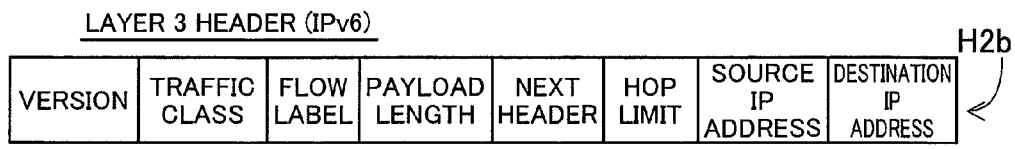

The Layer 3 header H2 is established according to the protocol of the third layer of the OSI reference model (the network layer). In the present embodiment, an IPv4 header H2a and an IPv6 header H2b are used as the Layer 3 header H2 (FIGS. 3D-3E). Each header H2a, H2b includes the source IP address field and the destination IP address field. The IPv4 header H2a includes the TOS (Type of Service) field. TOS is represented on 8 bits. The leading 3 bits are also called the IP precedence, and indicate priority of the IP packet. Larger numbers are associated with higher priority. In some instances, TOS may be set by the source (sender) device of the frame data FD (e.g. a personal computer). In other instances, TOS may be set (overwritten) by the relay device that relays the frame data FD (e.g. a router). The IP packet is the unit for transmitting data in the network layer.

Figure 3F:
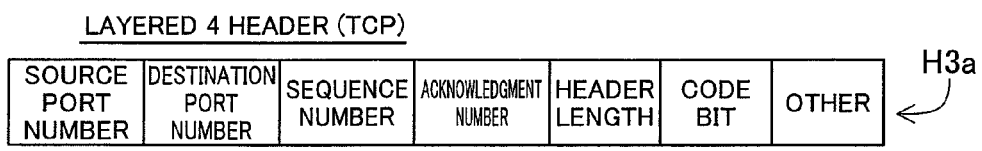
Figure 3G:
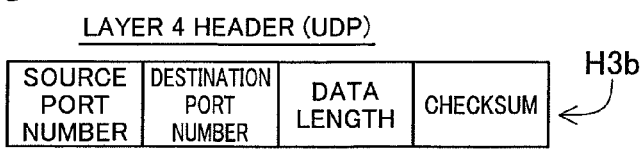

The Layer 4 header H3 is established according to the protocol of the fourth layer of the OSI reference model (the transport layer). In the present embodiment, the TCP header H3a and the UDP header H3b are used as the Layer 4 header H3 (FIGS. 3F-3G). The TCP header H3a is a header for communication in accordance with TCP (Transmission Control Protocol), while the UDP header H3b is a header for communication in accordance with UDP (User Datagram Protocol). Each header H3a, H3b includes the source port number field and the destination port number field. These port numbers are numbers in accordance with the Layer 4 protocol, and have no relation to the physical ports P for connecting the lines CV (FIG. 2).

FIG. 4 is an illustration of the priority table 334. The priority table 334 stores relationships between the header information and the processing priority. The priority determination module 330 (FIG. 2) determines the processing priority of the frame data by referring to the frame data header (FIGS. 3A-3G) and to this priority table 334.

In the embodiment depicted in FIG. 4, correspondence relationships are established for the processing priority and a combination of VLAN-ID, the user priority (UPRI), TOS (IP precedence), and other information. In the present embodiment, the processing priority is represented in two levels, "Low (PRI_0)" and "High (PRI_1)". In FIG. 4, the "*" mark indicates a match with an arbitrary value.

The relationship R1 of the first row indicates that the processing priority is "Low" in relation to the frame data that satisfies the conditions of "VLAN-ID=1, UPRI=0, TOS (IP precedence)=0." The correspondence relationship R2 of the second row indicates that the processing priority is "High" in relation to the frame data that satisfies the conditions of "VLAN-ID=1, UPRI=2, TOS=2." The correspondence relationship R3 of the third row indicates that the processing priority is "High" in relation any frame data whose VLAN-ID is "2."

In addition to the correspondence relationships R1 to R3 shown in FIG. 4, the priority table 334 also stores other correspondence relationships with different header information (not shown). In the present embodiment, concerning frame data whose VLAN-ID is "1", where at least either one among the user processing priority and TOS (IP precedence) is equal to or greater than 2, the processing priority is "High" (not shown). Where both the user processing priority and TOS (IP precedence) are equal to or less than 1, the processing priority is "Low." The priority determination module 330 (FIG. 2) determines the processing priority of any frame data through lookup in the priority table 334. The priority table 334 is established beforehand through user instruction. It is acceptable for the priority table 334 to define only some combinations among all possible combinations of the header information. In this case, the priority determination module 330 may employ a predetermined processing priority (e.g. "High") in relation to the header information not defined in the priority table 334.

FIG. 5 is an illustration of the statistical information table 332. The statistical information table 332 stores correspondence relationships among the processing priority, the cumulative number of frames, the cumulative number of bytes, the previous arrival time, the number of frames per second, the number of bytes per second, the upper limit threshold value, and the lower limit threshold value. Herein, the upper limit threshold value is termed simply the "upper limit" and the lower limit threshold value is termed simply the "lower limit."

The "cumulative number of frames" refers to the cumulative value of the number of frames received by the switching device 1000. The "cumulative number of bytes" refers to the cumulative value of the amount of data (in byte units) received by the switching device 1000. These cumulative values are cumulative values since the power-on of the switching device 1000. The "previous arrival time" indicates the time of arrival of the last frame data at the switching device 1000. This time is expressed in terms of elapsed time from this arrival time to the present time. The "number of frames per second" represents the number of received frames per unit of time. The "number of bytes per second" represents the amount of received data per unit of time. Any method may be used for calculating these quantities per unit of time. For example, an average value over a period from a predetermined preceding time (e.g. one minute ago) to the present time could be employed. The priority determination module 330 (FIG. 2) records these items of statistical information for each processing priority. In the embodiment of FIG. 5, statistical information associated with "processing priority=low," statistical information associated with "processing priority=high," and sums of these are recorded in the statistical information table 332. In the present embodiment, each network interface 300 is provided with an individual statistical information table 332. The statistical information table 332 indicates statistical information relating to the frame data received by the network interface 300 including the statistical information table 332.

Hereinafter, the value of the "number of frames per second" associated with "processing priority=low" will be termed zero-th load LD0. The value of the "number of frames per second" associated with "processing priority=high" will be termed first load LD1. The sum of these will be termed total load LDe. As will be discussed later, in the present embodiment, the upper limit and the lower limit indicate threshold values for the "number of frames per second." The measurement switching instruction module 900 (FIG. 2) switches the power mode of the switching device 1000 in accordance with the upper limit and the lower limit. The upper limit and the lower limit may be omitted from the statistical information table 332, instead storing the upper limit and the lower limit in a memory (not shown) of the measurement switching instruction module 900. The upper limit and the lower limit are set beforehand in accordance with user instructions.

The user can check the statistical information table 332 through a control panel or an administrative terminal. The control panel is a device provided to the switching device 1000, and includes a display such as a liquid crystal display, and an input device such as buttons (not shown). The administrative terminal is a terminal that is connected to the switching device 1000 (not shown). The user can check information of various kinds, not limited to the statistical information table 332. Furthermore, user can also input various instructions through the control panel or the administrative terminal.

FIG. 6 depicts the distribution table 342 utilized in the first power mode; and FIG. 7 depicts the distribution table 342 utilized in the second power mode. The first power mode and the second power mode indicate power modes (operating modes) of the switching device 1000. As will be discussed later, the first power mode is utilized in instances of low communication load, while the second power mode is utilized in instances of high communication load.

The distribution table 342 shows correspondence relationships between the processing priority and a frame processor list. The frame processor list is represented by identifiers (from 1 to N) of the frame processors 100. The distributor 340 (FIG. 2) selects the handling frame processor for each packet (frame data) in accordance with this distribution table 342.

According to the distribution table 342 of FIG. 6, if the processing priority is "Low," the distributor 340 (FIG. 2) will select the handling frame processor from among the first frame processor 100d1 to the k-th frame processor 100dk (that is, from the first group PG1). If the processing priority is "High," the procedure will be similar (the handling frame processor is selected from the first group PG1).

According to the distribution table 342 of FIG. 7, if the processing priority is "Low," the distributor 340 (FIG. 2) will select the handling frame processor from among the (k+1)-th frame processor 100dk+1 to the N-th frame processor 100dN (that is, from the second group PG2). If the processing priority is "High," the procedure will be similar to that of the first power mode depicted in FIG. 6 (the handling frame processor is selected from the first group PG1).

Figure 8A:
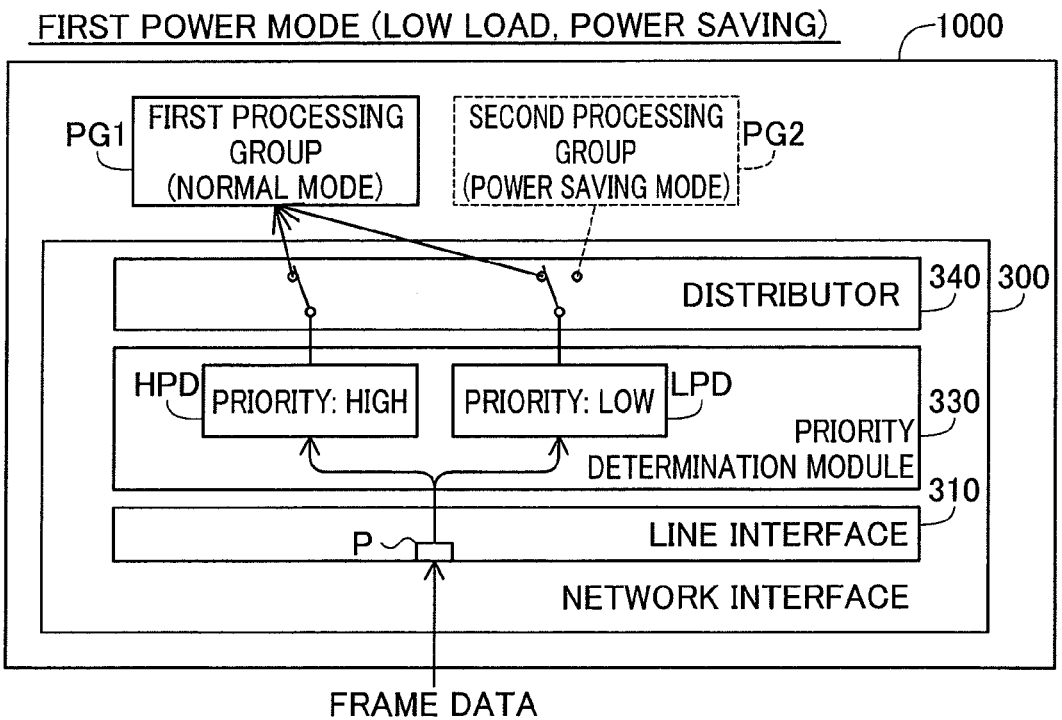
FIGS. 8A-8B are diagrammatic illustrations of the first and the second power mode.
Figure 8B:
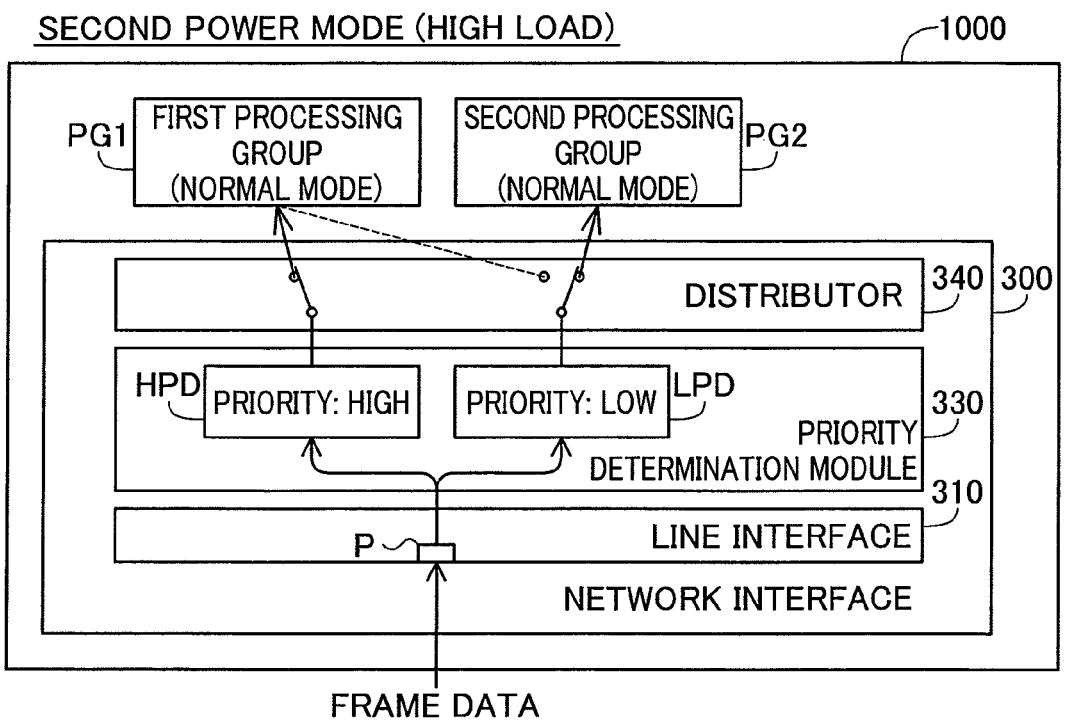

FIG. 8A is a diagrammatic illustration of the first power mode. FIG. 8B is a diagrammatic illustration of the second power mode. Each illustration depicts a processing state of the switching device 1000. The operating mode of the second group PG2 and the distribution of the frame data by the distributor 340 differ between the two power modes. Processes of the line interface 310 and of the priority determination module 330 are the same between the two power modes. Specifically, the line interface 310 receives the frame data, and then the priority determination module 330 determines the processing priority of the frame data in accordance with the priority table 334.

In the first power mode, the operating mode of the first group PG1 (frame processors 100) is the normal mode, and the operating mode of the second group PG2 (frame processors 100) is the power saving mode. In relation to frame data HPD with high processing priority (hereinafter termed "high-priority frame HPD"), the distributor 340 selects the handling frame processor from among the first group PG1 (FIG. 6). The distributor 340 then transmits the high-priority frame HPD to the handling frame processor. The procedure is the same for frame data HPD with low processing priority (hereinafter termed "low-priority frames LPD") as well (FIG. 6). Any method may be used for selecting a single handling frame processor from a group of frame processors. In the present embodiment, the distributor 340 calculates a hash value from the header information and selects a single frame processor according to the hash value. Any field may be employed as the header information for use in calculating the hash value (for example, at least part of the headers H1 to H3 shown in FIGS. 3A-3G). A predetermined field may be used here. Instead, the distributor 340 may select a single handling frame processor using the round robin technique.

In the second power mode, in contrast to the first power mode, the operating mode of the second group PG2 (frame processors 100) is the normal mode. In relation to low-priority frames LPD, the distributor 340 selects the handling frame processor from the second group PG2. The distributor 340 then transmits the frame data LPD to the handling frame processor. For high-priority frames HPD, the procedure is the same as in the first power mode.

In this way, power consumption of the switching device 1000 in the first power mode will be comparatively low. In the second power mode, on the other hand, the processing capability of the switching device 1000 will be comparatively high.

Figure 9:
FIG. 9 is an illustration of a control information table 122.

FIG. 9 is an illustration of the control information table 122. The control information table 122 stores the header information of the frame data received from the network interface 300. In the present embodiment, the control information table 122 represents an ordered list for each processing priority. This order is the same as the received order of the frame data. This list represents a list of the frame data (packets). Such list of the frame data (packets) is also known as the "queue". The control information table 122 represents two queues, a high processing priority queue HPQ and a low processing priority queue LPQ. As shown in FIG. 2, each frame processor 100 is provided with an individual control information table 122.

FIG. 9 depicts an instance in which the frame processor 100 has received five packets (frame data) a, b, c, d, and e in that order. Here, it is assumed that the processing priority is "Low" for three of the packets (frame data) a, b, e, while the processing priority is "High" for two of the packets (frame data) c, d. As will be discussed later, the priority controller 120 (FIG. 2) determines the processing order for frame data in accordance with this control information table 122.

Figure 10:
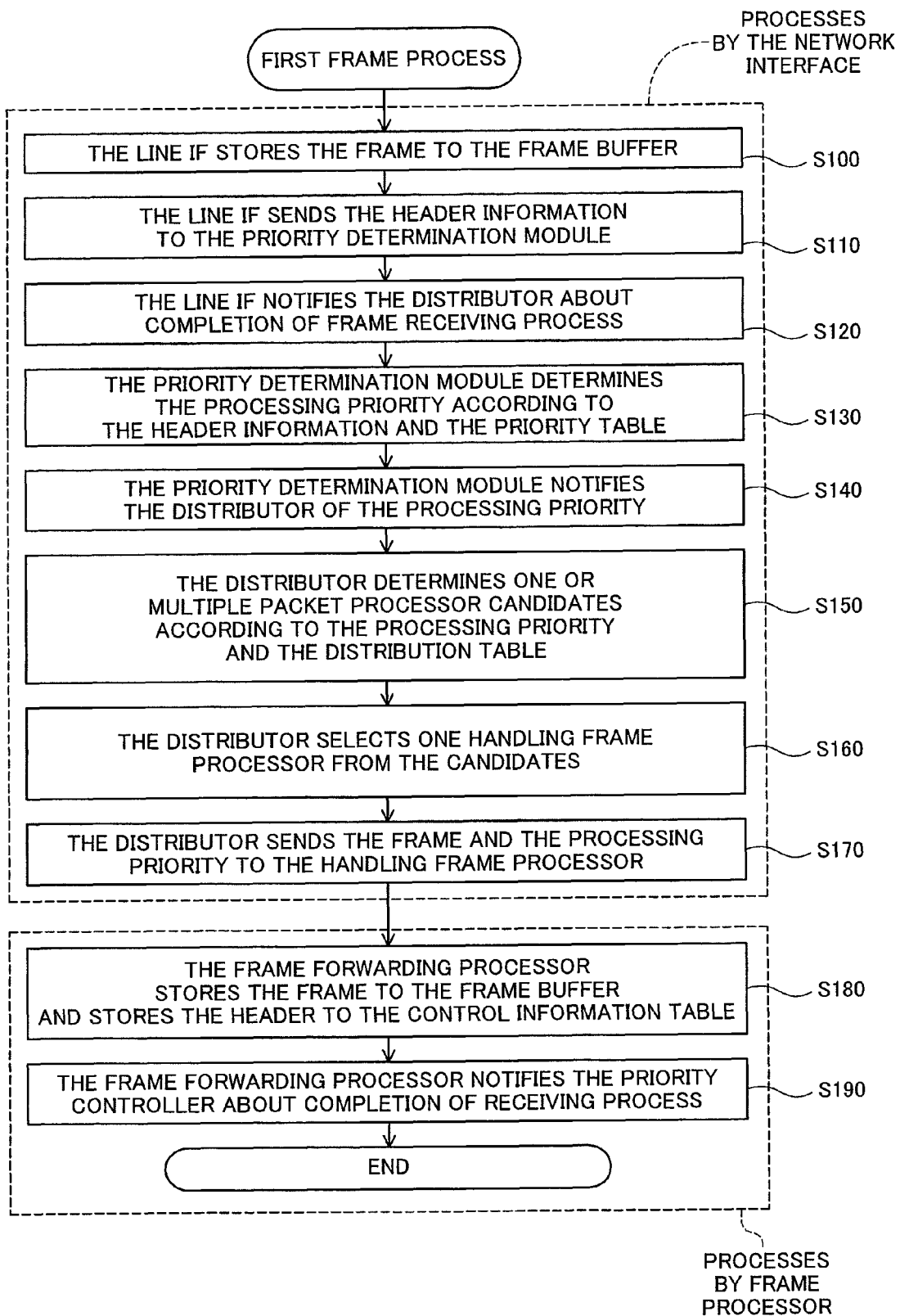
FIG. 10 is a flowchart depicting the sequence of a first frame process.

FIG. 10 is a flowchart depicting the sequence of a first frame process. This first frame process is a process for receiving frames. The switching device 1000 (FIG. 1, FIG. 2) initiates the process of FIG. 10 in response to receiving of the frame data.

In the initial Step S100, in response to receiving of the frame data from a physical port P (line CV), the line interface 310 (FIG. 2) stores the frame data into the frame buffer 320. In the next Step S110, the line interface 310 transmits the header information of the frame data to the priority determination module 330. Here, it would also be acceptable for the line interface 310 to send to the priority determination module 330 only that part utilized in determining of the processing priority. In the next Step S120, the line interface 310 notifies the distributor 340 about completion of the frame data receiving process.

In the next Step S130, the priority determination module 330 (FIG. 2) uses the header information as a search key to search the key in the priority table 334 (FIG. 4). The priority determination module 330 then employs the processing priority associated with the header information as the processing priority for the frame data. The priority determination module 330 then updates the statistical information table 332 (FIG. 5). Next, the priority determination module 330 notifies the distributor 340 of the processing priority of the frame data (Step S140).

In the next Step S150, in response to receiving of the notification of completion of the receiving process and the notification of the processing priority, the distributor 340 (FIG. 2) search through the distribution table 342 (FIG. 6, FIG. 7). As will be discussed later, the distribution table 342 to be used is selected from among two types of distribution table 342 (FIG. 6, FIG. 7) by the measurement switching instruction module 900. For this search, the processing priority is used as the search key. The distributor 340 then selects, as candidates, the frame processor list associated with the processing priority.

In the next Step S160, the distributor 340 (FIG. 2) selects one frame processor 100 (i.e. the handling frame processor) from among the candidates. As mentioned above, any method may be employed for selecting the handling frame processor. The distributor 340 may use a predetermined method. In the event that the total number of the frame processors 100 included among the candidates is "1," the distributor 340 selects that frame processor 100 as the handling frame processor.

In the next Step S170, the distributor 340 (FIG. 2) sends the frame data and the processing priority to the handling frame processor. The frame data is read out from the frame buffer 320.

In the next Step S180, the frame forwarding processor 110 (FIG. 2) stores the received frame data into the frame buffer 112. The frame forwarding processor 110 then extracts the header information from the frame data, and store the header information in the control information table 122 (FIG. 9) according to its processing priority. In the next Step S190, the frame forwarding processor 110 notifies the priority controller 120 of completion of the frame data receiving process. In the event that there is no free space in the frame buffer, the frame forwarding processor 110 discards the received frame data.

The first frame process described above is executed each time that the switching device 1000 receives the frame data. As a result, if the reception frequency of the frame data is high, the control information table (FIG. 9) stores information relating to multiple frames.

Figure 11:
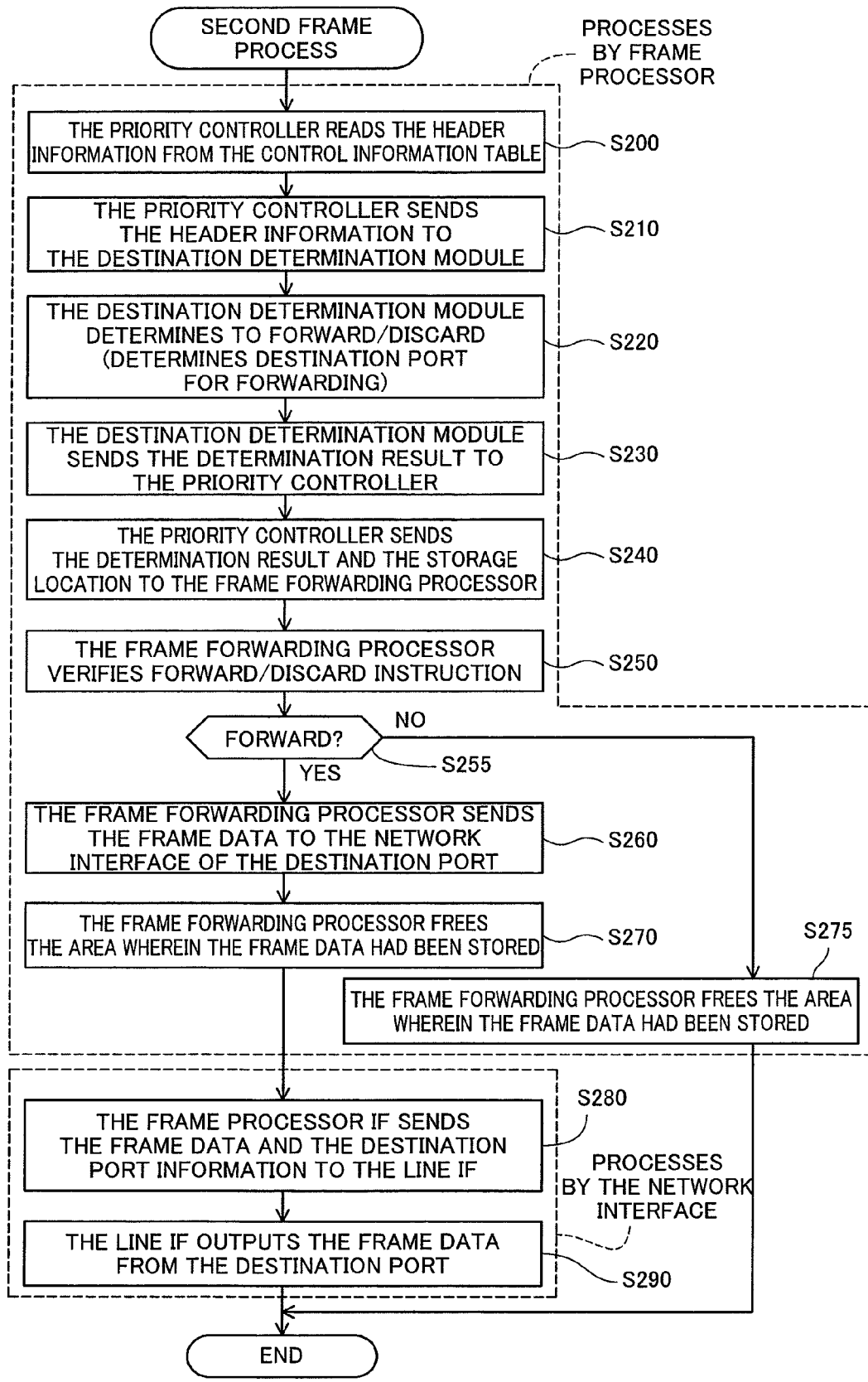
FIG. 11 is a flowchart depicting the sequence of a second frame process.

FIG. 11 is a flowchart depicting the sequence of a second frame process. This second frame process is a process for forwarding frames. In the initial Step S200, the priority controller 120 (FIG. 2) selects a single frame from the control information table 122 (FIG. 9) and reads out the header information of that frame. Any method giving priority to frames with high processing priority could be used as the method for selecting the single frame. For example, it would be possible to employ so-called priority queuing. With this method, if one or more frames are registered in the high priority queue HPQ (FIG. 9), a frame is selected from the high priority queue HPQ. If no frame is registered in the high priority queue HPQ, a frame is selected from the low priority queue LPQ. The order of frame selection in the respective queues HPQ, LPQ is the same as the received order of the frames.

In the next Step S210, the priority controller 120 (FIG. 2) sends the read out header information to the destination determination module 130.

In the next Step S220, the destination determination module 130 (FIG. 2) determines whether to forward the frame or to discard it in accordance with the received header information. The destination determination module 130 may make this decision, for example, according to a filter table (not shown). The filter table defines a condition or conditions under which the frame is discarded. Any condition may be employed as such discard conditions. For example, it would be possible to employ a condition that the value in a predetermined field is set to a predetermined value. Specifically, it would be possible to employ a condition such as that "the destination port number of the Layer 4 header H3a, H3b (FIGS. 3F-3G) is 80."

When it is determined to forward the frame, the destination determination module 130 (FIG. 2) determines the destination line (destination physical port) in accordance with destination information in the header information (e.g. the destination MAC address in the Layer 2 header H1). The destination physical port means the physical port P to be used for transmitting the frame. The destination line means the line connected to the destination physical port. Correspondence relationships between the destination information and the destination physical ports are established beforehand. Such correspondence relationships may be established in accordance with user instructions, or set automatically by the destination determination module 130. The destination determination module 130 is able to learn correspondence relationships between the destination information and the destination physical ports by receiving, from the network interface 300, the source information included in the header information and the identifying information of the physical port P that received the frame data (for example, the source MAC address in the Layer 2 header H1 (FIGS. 3B-3C) may be employed as the destination information). The frame processors 100 preferably share the learned results each other. The destination determination module 130 may also use other information (e.g. the VLAN-ID) in addition to the destination information to determine the destination physical port.

In the next Step S230, the destination determination module 130 (FIG. 2) sends the determination result obtained in Step S220 to the priority controller 120. This determination result includes either one among an instruction to forward the frame and an instruction to discard the frame. The frame forwarding instruction includes information identifying the destination physical port (hereinafter termed "destination physical port information"). In the next Step S240, the priority controller 120 sends the determination result, together with the storage location of the frame data in the frame buffer 112, to the frame forwarding processor 110.

In the next Step S250, the frame forwarding processor 110 (FIG. 2) verifies whether the received instruction is the frame forwarding instruction. If the received instruction is the frame forwarding instruction (S255: Yes), the process advances to Step S260.

In the next Step S260, the frame forwarding processor 110 (FIG. 2) sends the frame data and the destination physical port information to the network interface 300 including the destination physical port. In the next Step S270, the frame forwarding processor 110 frees the area storing the frame data in the frame buffer 112. This allows the frame forwarding processor 110 to use this area as a free area to store new frame data. The frame forwarding processor 110 also delete information relating to the frame data from the control information table 122.

In the next Step S280, the frame processor interface 350 (FIG. 2) transmits the received data (the frame data and the destination physical port information) to the line interface 310. In the next Step S290, the line interface 310 transmits the frame data from the physical port P designated by the destination physical port information. The second frame process then terminates.

If the received instruction is the frame discarding instruction (S255: No), the process advances to Step S275. The process of Step S275 is the same as the process of Step S270 described above. In response to completion of Step S275, the second frame process terminates.

The second frame process (forwarding process) of FIG. 11 described above shows the process in relation to a single frame. This second frame process will be executed repeatedly until the queue (the control information table (FIG. 9)) becomes empty. The priority controller 120 (FIG. 2) acknowledges that new frame data has been registered in the control information table 122 In accordance with the notification of Step S190 in FIG. 10. The priority controller 120 then executes the second frame process of FIG. 11 (forwarding process) in accordance with the updated control information table 122.

Figure 12:
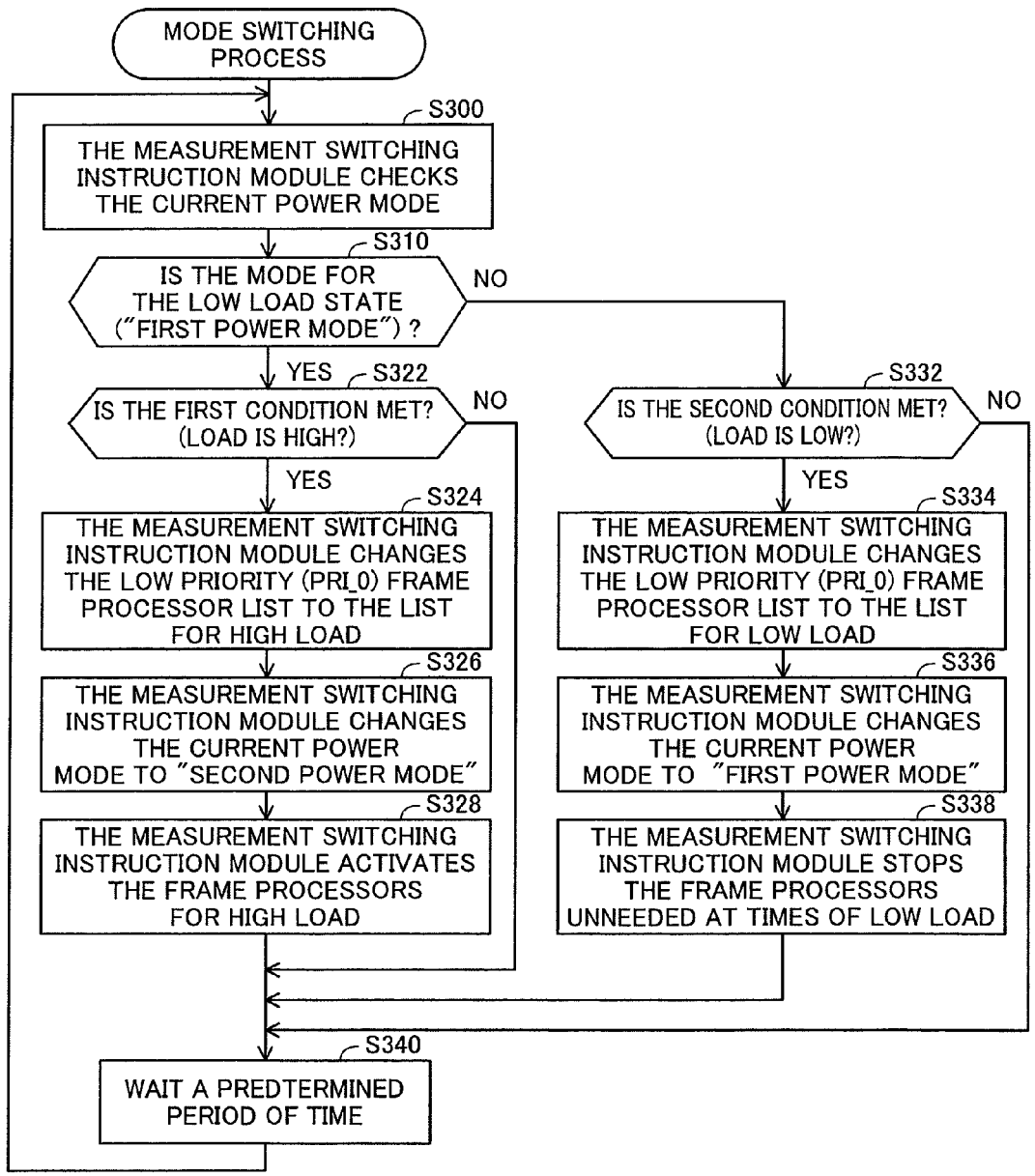
FIG. 12 is a flowchart depicting the sequence of a power mode switching process.
Figure 13:
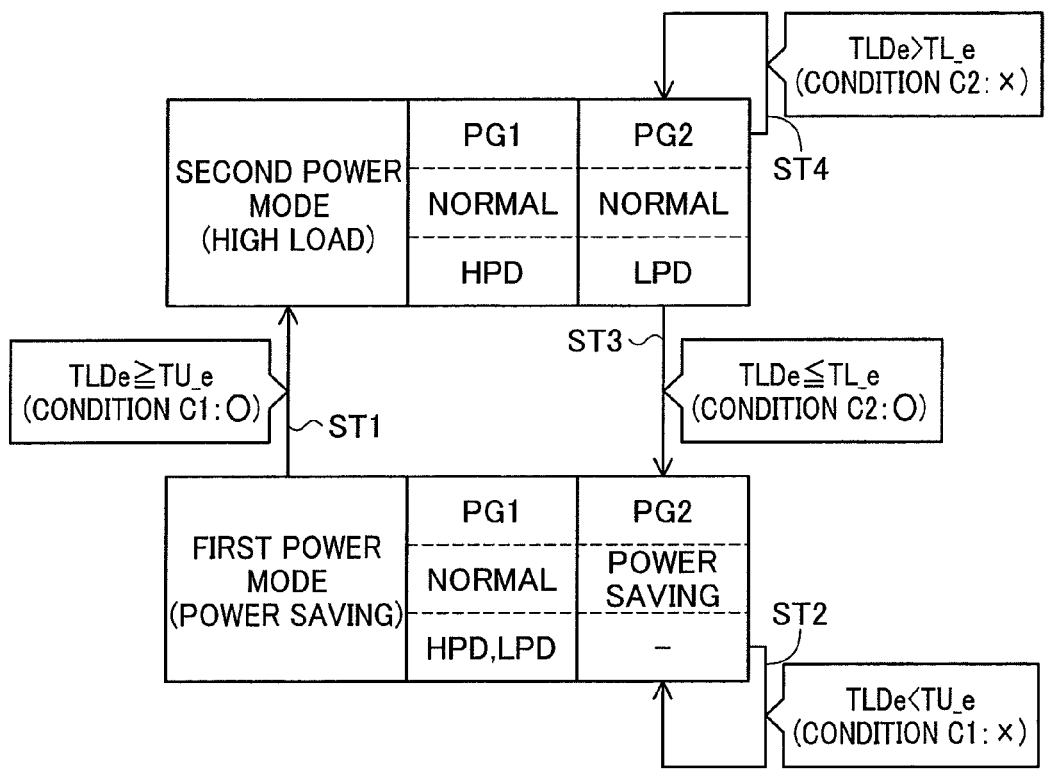
FIG. 13 is a illustration depicting transition between power modes.

FIG. 12 is a flowchart depicting the sequence of a power mode switching process. The measurement switching instruction module 900 (FIG. 1, FIG. 2) executes this switching process independently of the first frame process (receiving process) of FIG. 10 and the second frame process (forwarding process) of FIG. 11. FIG. 13 is an illustration depicting transition between power modes. FIG. 13 depicts respective states of the first group PG1 and the second group PG2 in each power mode. The illustrated states are the operating mode and the processing priority of the processing target.

In the initial Step S300 in FIG. 12, the measurement switching instruction module 900 (FIG. 2) checks the current power mode. Information indicating the current power mode is stored in memory (not shown) in the measurement switching instruction module 900. If the current power mode is the "first power mode" the process advances to Step S322 (S310: Yes).

As depicted in FIG. 13, in the first power mode, the operating mode of the first group PG1 is "normal mode," and the first group PG1 processes both the high-priority frames HPD and the low-priority frames LPD (FIG. 8A). The operating mode of the second group PG2 is "power saving mode," and the second group PG2 will not carry out forwarding processes.

In Step S322 of FIG. 12, the measurement switching instruction module 900 (FIG. 2) refers to the statistical information table 332 (FIG. 5) to determine whether the statistical information satisfies a first transition condition. This first transition condition is a condition for switching the power mode from the first mode to the second mode, and indicates a high communication load. In the present embodiment, the first transition condition is as follows.

(Condition C1) The sum TLDe of total load LDe (FIG. 5) in relation to all network interfaces 300 is equal to or greater than an upper limit TU_e.

Here, the upper limit TU_e is set beforehand to a value that is somewhat smaller than the maximum value of processing capability of the first group PG1. The fact that the statistical information satisfies this first transition condition C1 indicates that the communications load is going to exceed the processing capability of the first group PG1. The upper limit TU_e may be determined experimentally beforehand.

In the event that the first transition condition C1 is met, in the next Step S324 the measurement switching instruction module 900 (FIG. 2) changes the distribution tables 342 of all of the network interfaces 300. At this stage, the distribution tables 342 before the change are tables for use in the first power mode (FIG. 6). The measurement switching instruction module 900 then update the frame processor list for "processing priority=Low" from the list for the first power mode (FIG. 6) to the list for the second power mode (FIG. 7). The frame processor list for "processing priority=High" will not be modified. According to this change, the handling frame processors for frames of low processing priority are switched from the first group PG1 to the second group PG2 (FIG. 10: S150). As a result, the communications load on the first group PG1 will reduce, thus suppressing the discarding of the high-priority frames HPD by the first group PG1.

In the next Step S326, the measurement switching instruction module 900 (FIG. 2) update the information indicating the current power mode to represent the "second power mode."

In the next Step S328, the measurement switching instruction module 900 (FIG. 2) starts up the frame processors 100 for high load, namely, the second group PG2 (FIG. 1). Specifically, the measurement switching instruction module 900 sends a startup instruction to each frame processor 100 of the second group PG2. In response to this startup instruction, each frame processor 100 switches its operating mode from the "power saving mode" to the "normal mode." The frame processors 100 also execute various initialization processes necessary for initiating the forwarding process. Such initialization processes might include, for example, a process to free the frame buffer 112, or a process to copy correspondence relationships between the destination information and the destination physical ports from another frame processor 100.

Through the aforementioned Steps S324, S326, and S328, the power mode transitions from the first power mode to the second power mode (FIG. 13: ST1). As depicted in FIG. 13, in the second power mode, the operating mode of the first group PG1 is the normal mode, and the first group PG1 processes high-priority frames HPD. The operating mode of the second group PG2 is the normal mode, and the second group PG2 processes low-priority frames LPD.

In the next Step S340 of FIG. 12, the measurement switching instruction module 900 (FIG. 2) waits for a predetermined period of time (e.g. 10 seconds) to elapse. After the elapse of the predetermined period of time, the measurement switching instruction module 900 returns again to Step S300. In Step S322, if the first transition condition C1 is not met, the measurement switching instruction module 900 skips Steps S324, S326, and S328 and proceeds to Step S340. In this case, the first power mode is maintained (FIG. 13: ST2). That is, the second group PG2 maintains the power saving mode.

In Step S310 of FIG. 12, if the current power mode is the "second power mode" the process proceeds to Step S332.

In Step S332, the measurement switching instruction module 900 (FIG. 2) refers to the statistical information table 332 (FIG. 5) to determine whether the statistical information satisfies a second transition condition. This second transition condition is a condition for switching the power mode from the second power mode to the first power mode, and indicates a low communication load. In the present embodiment, the second transition condition is as follows.

(Condition C2) The sum TLDe of total load LDe (FIG. 5) in relation to all network interfaces 300 is equal to or less than a lower limit TL_e.

Here, the lower limit TL_e is set beforehand to a value that is somewhat smaller than the maximum value of processing capability of the first group PG1. The fact that the statistical information satisfies this second transition condition C2 indicates that the processing capability of the first group PG1 alone is enough to handle the communications load. The lower limit TL_e may be determined experimentally beforehand (this lower limit TL_e will preferably be smaller than the upper limit TU_e described above).

In the event that the second transition condition C2 is met, in the next Step S334, the measurement switching instruction module 900 (FIG. 2) changes the distribution tables 342 of all of the network interfaces 300. At this stage, the distribution tables 342 before the change are tables for use in the second power mode (FIG. 7). The measurement switching instruction module 900 then update the frame processor list from for the "processing priority=Low" from the list for the second power mode (FIG. 7) to the list for the first power mode (FIG. 6). The frame processor list for "processing priority=High" will not be modified. According to this change, the handling frame processors for frames of low processing priority are switched from the second group PG2 to the first group PG1 (FIG. 10: S150).

In the next Step S336, the measurement switching instruction module 900 (FIG. 2) update the information indicating the current power mode to represent the "first power mode."

In the next Step S338, the measurement switching instruction module 900 (FIG. 2) stops the frame processors 100 that are not needed at times of low communication load, namely, the second group PG2 (FIG. 1). Specifically, the measurement switching instruction module 900 sends a stop instruction to each frame processor 100 of the second group PG2. In response to this stop instruction, each frame processor 100 switches its operating mode from the "normal mode" to the "power saving mode." As a result, power consumption by the switching device 1000 will reduce.

Through the aforementioned Steps S334, S336, and S338, the power mode transitions from the second power mode to the first power mode (FIG. 13: ST3). Following Step S338, the process proceeds to Step S340.

In Step S332, if the second transition condition C2 is not met, the measurement switching instruction module 900 skips Steps S334, S336, and S338 and proceeds to Step S340.

In this case, the second power mode is maintained (FIG. 13: ST4). That is, the second group PG2 maintains the normal mode.

In the above manner, according to the present embodiment, the power mode is switched by changing the handling frame processors for low-priority frames LPD, without changing the handling frame processors for high-priority frames HPD. As a result, with regard to high-priority frames HPD, forwarding problems caused by switching of the handling frame processor can be suppressed (examples of such problems are discarding of frames or excessive delay in frame forwarding). That is, reliability of data relay of high-priority frames HPD can take priority over reliability of data relay of low-priority frames LPD. In this way, in the present embodiment, both the reliability of data relay and power consumption can be controlled.

Moreover, in the present embodiment, the operating mode of the first group PG1 processing high-priority frames HPD will be maintained in the same mode (in this case, normal mode) in both the first power mode and the second power mode. Consequently, there will be marked advantage in terms of suppressing problems in forwarding of high-priority frames HPD.

Additionally, in the present embodiment, in the first power mode, the first group PG1 is selected for processing the high priority and the low priority in common. Consequently, the total number of frame processors 100 operating in normal mode can be reduced. Power consumption can be reduced as a result. Furthermore, in the second power mode, the second group PG2 is selected in place of the first group GP for processing the low priority. As a result, problems with forwarding of high-priority frames HPD can be suppressed.

Moreover, in the present embodiment, the handling frame processors for the low-priority frames LPD are switched from the first group PG1 to the second group PG2 without waiting for completion of startup of the second group PG2 (FIG. 12: S324). As a result, problems with forwarding of high-priority frames HPD caused by excessive communications load on the first group PG1 can be suppressed. Also, problems relating to high-priority frames HPD (e.g. discarding of frames) will be suppressed, making it possible to reduce the capacity of the frame buffer 320 (FIG. 2) or the frame buffer 112. In the present embodiment, if the network interface 300 receives the low-priority frame LPD prior to completion of startup of the second group PG2, the second group PG2 is be able to process that low-priority frame LPD. In this case, the distributor 340 (FIG. 2) discards that low-priority frame LPD.

Further, in the present embodiment, the frame processors 100 executes the forwarding process in accordance with priority queuing. In this forwarding process, processing of the high-priority frames HPD has priority over processing of the low-priority frames LPD. As a result, problems with forwarding of high-priority frames HPD can be suppressed.

B. Embodiment 2

Figure 14:
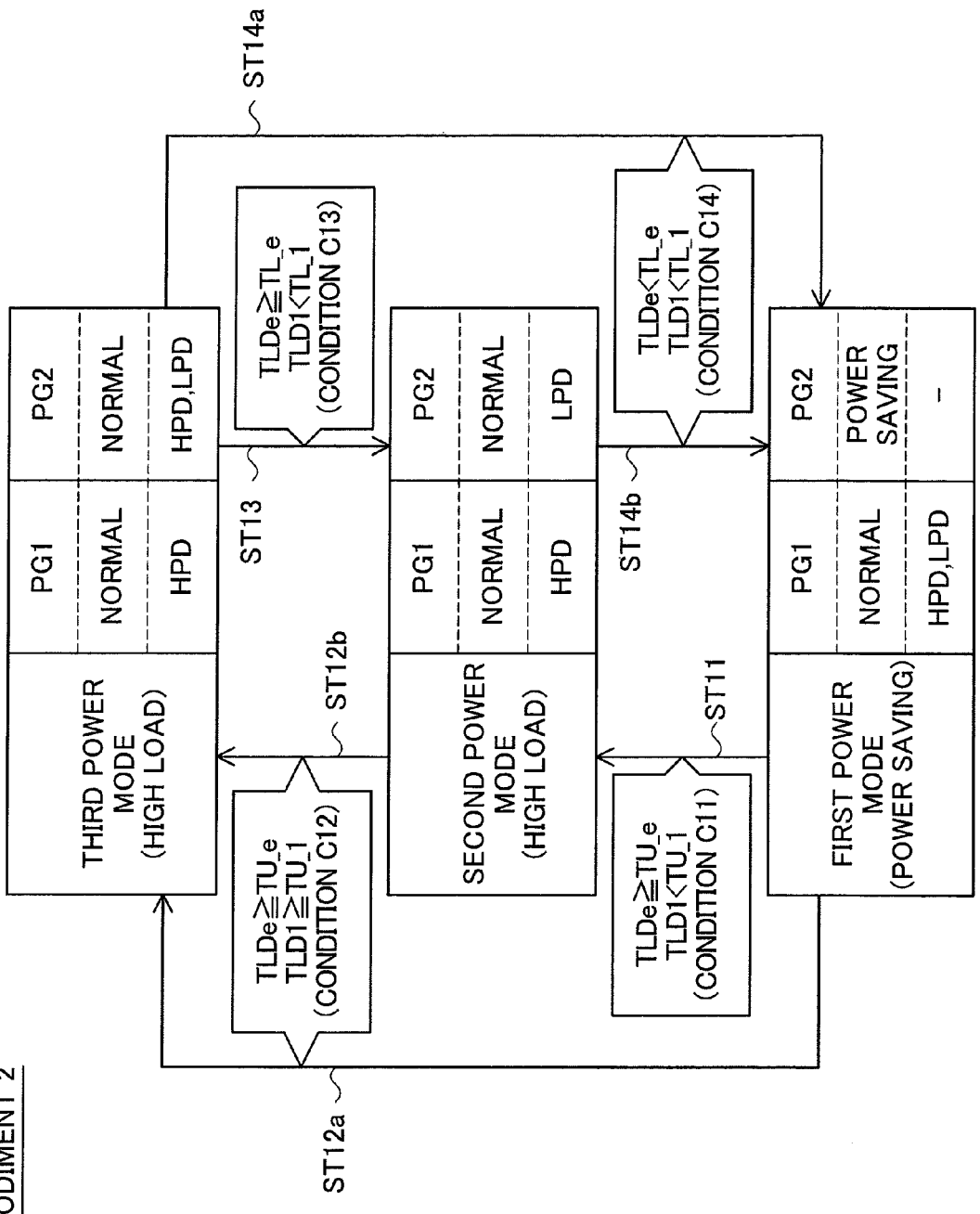
FIG. 14 is a illustration depicting transition between power modes in Embodiment 2.

FIG. 14 is an illustration depicting transition between power modes in Embodiment 2. A point of difference from Embodiment 1 shown in FIG. 13 is that three power modes are available. The configuration of the switching device 1000 is the same as that of Embodiment 1 depicted in FIGS. 1 and 2.

The first power mode and the second power mode are the same as in Embodiment 1 illustrated in FIG. 13. The third power mode is a mode equivalent to the second power mode with the following modification. The modification is that the second group PG2 can process the high-priority frames HPD in addition to the first group PG1. Specifically, both the first group PG1 and the second group PG2 are employed as candidates for the handling frame processor for the high-priority frames HPD. As a result, in this third power mode, problems with forwarding of the high-priority frames HPD can be suppressed even in instances where the high-priority frame HPD communication load is high.

The transition condition C11 shown below is a condition for switching the power mode from the first to the second mode (ST11).

(Condition C11) The sum TLDe of total load LDe (FIG. 5) in relation to all network interfaces 300 is equal to or greater than the upper limit TU_e, and the sum TLD1 of the first load LD1 in relation to all network interfaces 300 is less than the upper limit TU_1.

This condition C11 is equivalent to the condition C1 above, but with the added condition that "TLD1<TU_1." The upper limit TU_1 is preset beforehand to a value smaller than the maximum processing capability of the first group PG1. This added condition indicates that the communications load of high-priority frames HPD can be handled by the processing capability of the first group PG1 alone. As in the Embodiment 1, problems with forwarding of the high-priority frames HPD can be suppressed by switching the power mode to the second mode according to this condition C11.

The second transition condition C12 shown below is a condition for switching the power mode from the first to the third mode (ST12a), or from the second to the third mode (ST12b). (Condition C12) The sum TLDe of total load LDe (FIG. 5) in relation to all network interfaces 300 is equal to or greater than the upper limit TU_e, and the sum TLD1 of the first load LD1 in relation to all network interfaces 300 is equal to or greater than the upper limit TU_1.

This condition C12 is equivalent to the condition C1 above, but with the added condition that "the sum TLD1 is equal to or greater than the upper limit TU_1." This added condition indicates that the communications load of high-priority frames HPD is going to exceed the processing capability of the first group PG1. By switching the power mode to the third mode according to this condition C12, problems with forwarding of high-priority frames HPD can be suppressed, even in instances of high communications load of the high-priority frames HPD.

The third transition condition C13 shown below is a condition for switching the power mode from the third to the second mode. (Condition C13) The sum TLDe of total load LDe (FIG. 5) in relation to all network interfaces 300 is equal to or greater than the lower limit TL_e, and the sum TLD1 of the first load LD1 in relation to all network interfaces 300 is less than the lower limit TL_1.

A sum TLDe equal to or greater than the lower limit TL_e indicates that the communications load is high. The lower limit TL_1 is preset beforehand to a value smaller than the maximum processing capability of the first group PG1. A sum TLD1 less than the lower limit TL_1 indicates that the communications load of the high-priority frames HPD can be handled by the processing capability of the first group PG1 alone. Problems with forwarding of the low-priority frames LPD can be suppressed by switching the power mode to the second mode according to this condition C13. In preferred practice, the lower limit TL_1 will be smaller than the upper limit TU_1.

The fourth transition condition C14 shown below is a condition for switching the power mode from the third to the first mode (ST14a), or from the second to the first mode (ST14b).

(Condition C14) The sum TLDe of total load LDe (FIG. 5) in relation to all network interfaces 300 is less than the lower limit TL_e, and the sum TLD1 of the first load LD1 in relation to all network interfaces 300 is less than the lower limit TL_1.

A sum TLDe less than the lower limit TL_e indicates that the communications load is low. By switching the power mode to the first mode according to this condition C14, power consumption of the switching device 1000 can be reduced while also suppressing problems with forwarding of the high-priority frames HPD.

In this way, according to Embodiment 2, in the event of high communications load of the high-priority frames HPD the measurement switching instruction module 900 (FIG. 2) will be able to expand the pool of candidates for the handling frame processor for the high-priority frames HPD (third power mode). As a result, problems with forwarding in relation to the high-priority frames HPD can be suppressed. Moreover, in Embodiment 2, the measurement switching instruction module 900 utilizes three kinds of distribution table 342 (not shown) respectively corresponding to the three power modes. Here, when switching from the first to the second power mode, in preferred practice the measurement switching instruction module 900 will switch the distribution table 342 without waiting for completion of switching of the operating mode of the second group PG2. Problems with forwarding of the high-priority frames HPD can be suppressed thereby.

Frame reception and frame forwarding are performed analogously to Embodiment 1 depicted in FIGS. 10 and 11. If the transition condition shown in FIG. 14 is not met, the measurement switching instruction module 900 (FIG. 2) will maintain the current power mode.

C. Embodiment 3

Figure 15:
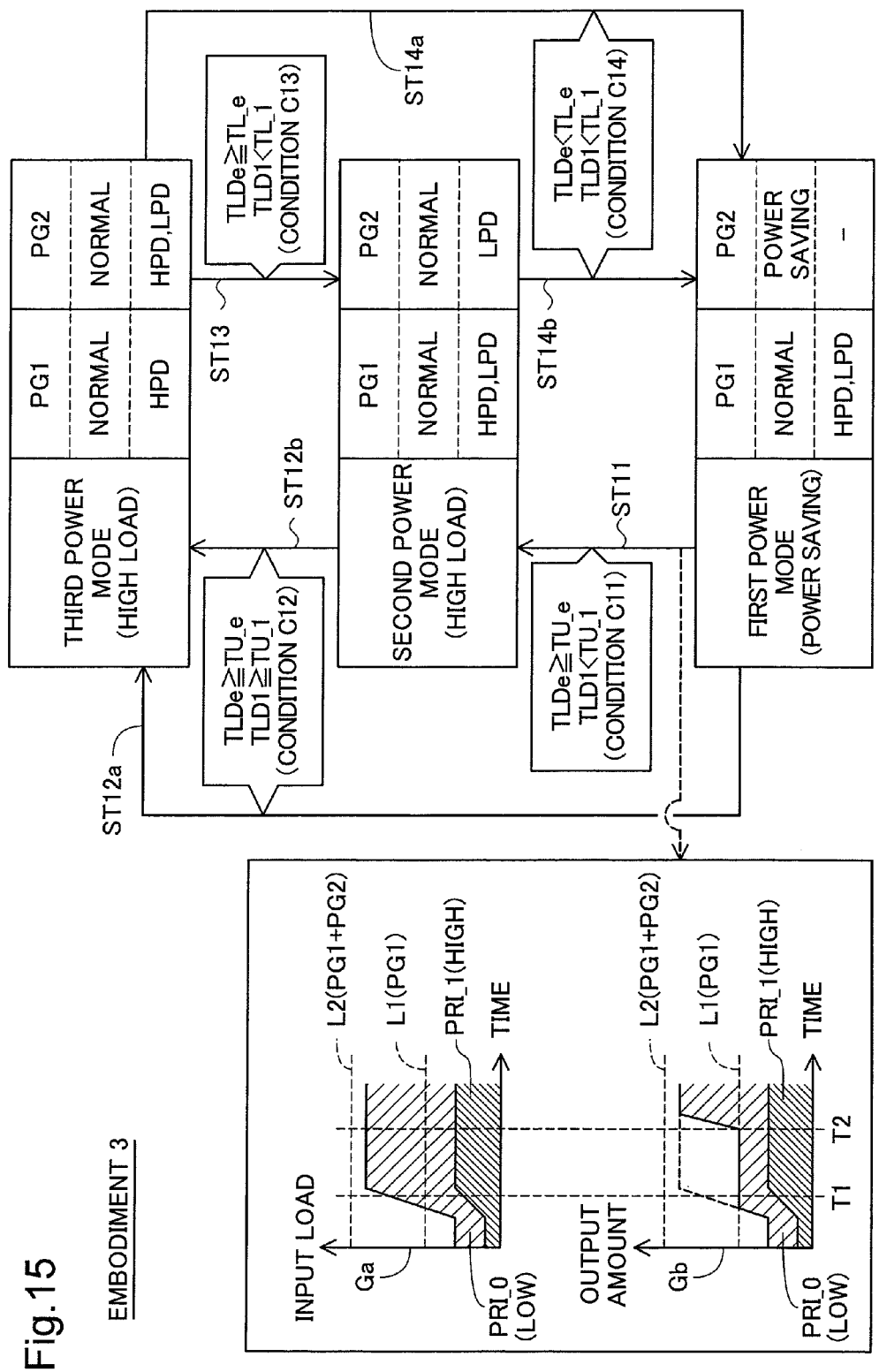
FIG. 15 is a illustration depicting transition between power modes in Embodiment 3.

FIG. 15 is an illustration depicting transition between power modes in Embodiment 3. The only difference from Embodiment 2 shown in FIG. 14 is the different distribution of the low-priority frames LPD in the second power mode. Other processes and arrangements are the same as in Embodiment 2.

In the second power mode of Embodiment 3, the first group PG1 processes the low-priority frames LPD in addition to the second group PG2. Specifically, both the first group PG1 and the second group PG2 are employed as candidates for the frame processor assigned to handle process the low-priority frames LPD. As a result, problems with forwarding of the low-priority frames LPD can be suppressed.

Two graphs Ga, Gb are depicted in FIG. 15. The first graph Ga shows temporal change of input load, while the second graph Gb shows temporal change of output amount. Both input load and output amount are expressed in terms of the number of frames per unit of time. These graphs Ga, Gb show changes occurring when the power mode switches from the first to the second mode (ST11). A start time T1 represents the point in time of initiation of switching from the first to the second mode, and an end time T2 indicates the point in time that activation (start-up) of the second group PG2 is complete. The first line L1 indicates a value corresponding to the maximum value of processing capability of the first group PG1, and the second line L2 indicates a value corresponding to the maximum value of the combined processing capability of the two groups PG1 and PG2. In the graphs Ga, Gb, the number of frames PRI_1 of "High" processing priority and the number of frames PRI_0 of "Low" processing priority are depicted by mutually different hatching.

As illustrated, prior to the end time T2, there may be instances in which some of the low-priority frames LPD (PRI_0) are discarded. Subsequent to the end time T2, however, it will be possible to forward a large amount of the low-priority frames LPD. For example, it will be possible to forward the low-priority frames LPD in an amount exceeding the processing capability of the second group PG2.

D. Embodiment 4

Figure 16:
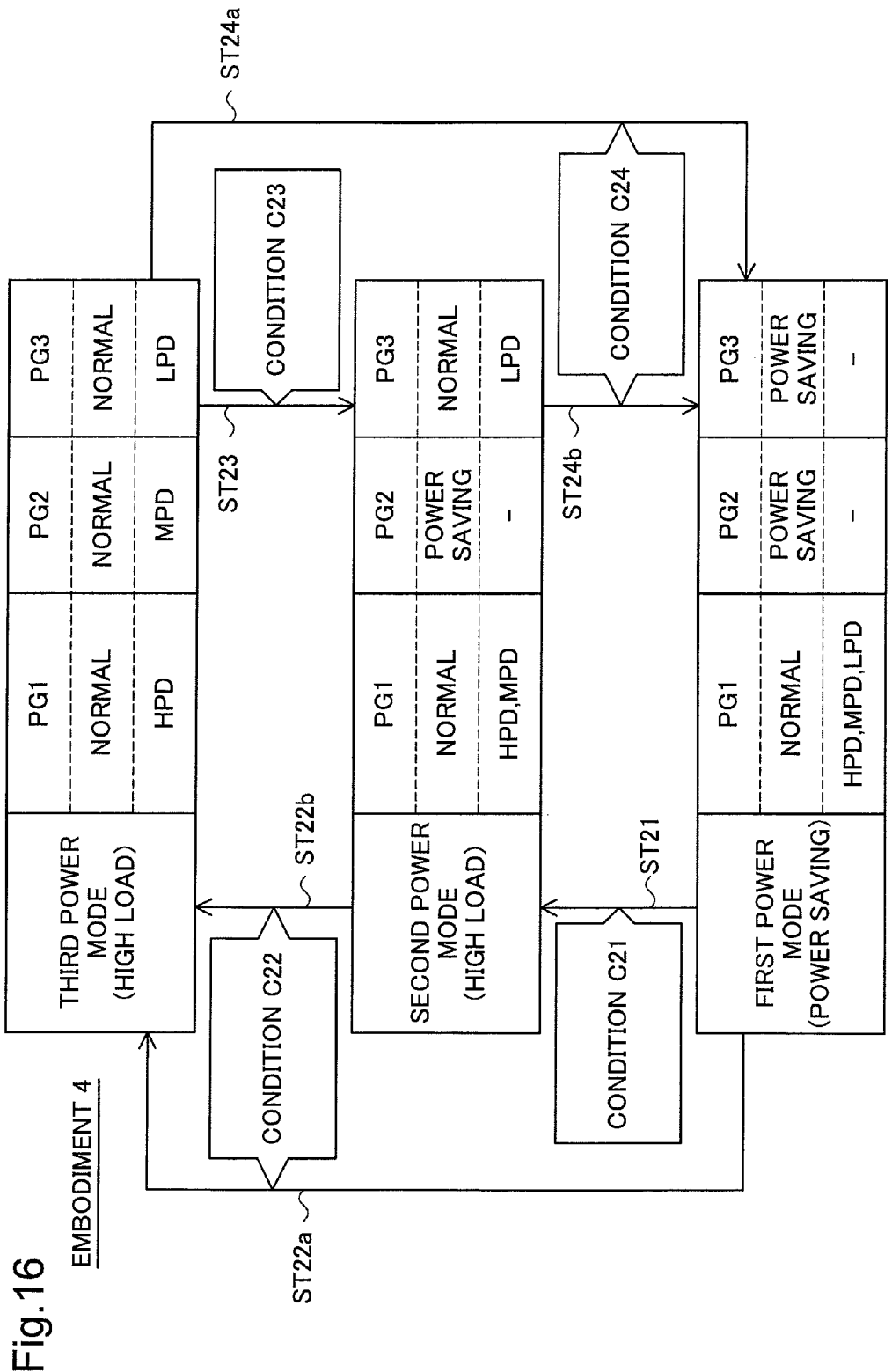
FIG. 16 is a illustration depicting transition between power modes in Embodiment 4.

FIG. 16 is an illustration depicting transition between power modes in Embodiment 4. There are two differences from the embodiments described above. The first difference is that processing priority is represented by three levels, "Low," "Medium," and "High." The second difference is that the N frame processors 100 have been grouped beforehand into three groups PG1, PG2, PG3. The configuration of the switching device 1000 is the same as in FIGS. 1 and 2.

In the first power mode, the operating mode of the first group PG1 is the normal mode, and the operating modes of the other groups PG2, PG3 are the power saving mode. The first group PG1 processes all of the high-priority frames HPD, the medium-priority frames MPD, and the low-priority frames LPD.

In the second power mode, in contrast to the first power mode, the operating mode of the third group PG3 is the normal mode. Further, the third group PG3 processes the low-priority frames LPD, in place of the first group PG1. Other arrangements are the same as in the first power mode. In this second power mode, power consumption will be greater than in the first power mode. On the other hand, it will be possible to suppress problems with forwarding the high-priority and the medium-priority frames HPD, MPD, even where the low-priority frame LPD communications load is high.

In the third power mode, in contrast to the second power mode, the operating mode of all of the groups PG1, PG2, and PG3 is the normal mode. Additionally, the second group PG2 processes the medium-priority frames MPD, in place of the first group PG1. Other arrangements are the same as in the second power mode. In this third power mode, power consumption will be greater than in the second power mode. On the other hand, it will be possible to suppress problems with forwarding high-priority frames HPD, even where the medium-priority frame MPD communications load is high.

As a condition C21 for switching the power mode from the first to the second mode (ST21), it would be possible to employ any condition indicative of low communications load of high-priority frames HPD and of medium-priority frames MPD respectively, and of high communications load on the first group PG1. For example, condition C21 could be that "the sum load of all processing priorities (frames per second) is equal to or greater than a first threshold value, and the sum load of the high priority and the medium priority is less than a second threshold value." In preferred practice, the first threshold value and the second threshold value will respectively be smaller than the maximum value of processing capability of the first group PG1. By so doing, problems with forwarding frames HPD, MPD due to increased load on the first group PG1 can be suppressed.

As a condition C22 for switching the power mode from the first to the third mode or from the second to the third mode (ST22a, ST22b), it would be possible to employ any condition indicative of high communications load on the first group PG1. For example, the condition C22 could be that "the medium priority load (frames per second) is equal to or greater than a third threshold value, and the low priority load is equal to or greater than a fourth threshold value." In preferred practice, the third threshold value and the fourth threshold value will respectively be smaller than the maximum value of processing capability of the first group PG1. By so doing, problems with forwarding high-priority frames HPD due to increased load on the first group PG1 can be suppressed.

As a condition C23 for switching the power mode from the third to the second mode (ST23), it would be possible to employ any condition indicative of low sum communications load of the high-priority frames HPD and the medium-priority frames MPD, and a large communications load of the low-priority frames LPD. For example, the condition C23 could be that "the sum load of all processing priorities (frames per second) is equal to or greater than a fifth threshold value, and the sum load of the high priority and the medium priority (frames per second) is less than a sixth threshold value." In preferred practice, the fifth threshold value and the sixth threshold value will respectively be smaller than the maximum value of processing capability of the first group PG1. By so doing, power consumption can be reduced, while suppressing problems with forwarding frames HPD, MPD.

As a condition C24 for switching the power mode from the third to the first mode or from the second to first mode (ST24a, ST24b), it would be possible to employ any condition indicative of low communications load of the frames HPD, MPD, and LPD respectively. For example, condition C24 could be that "the sum load of all processing priorities (frames per second) is equal to or less than a seventh threshold value." In preferred practice, the seventh threshold value will be smaller than the maximum value of processing capability of the first group PG1. By so doing, power consumption can be reduced while suppressing problems with forwarding of frames HPD, MPD.

In preferred practice, the threshold values employed in the conditions C21, C22, C23, C24 above will be determined experimentally beforehand so as to avoid problems with forwarding the high-priority frames HPD.

Also, in preferred practice, when switching the power mode from the first to the second mode the measurement switching instruction module 900 (FIG. 2) will switch the distribution table 342 (FIG. 2) without waiting for completion of switching of the operating mode of the frame processors 100 (the third group PG3). Thereby problems can be suppressed with forwarding of frames of relatively high priority (in this embodiment, the high-priority frames HPD and the medium-priority frames MPD). The same will be true when switching the power mode from the first to the third mode, and when switching the power mode from the second to the third mode.

The frame processors 100 (FIG. 1, FIG. 2) may utilize three queues of differing priority in association with the three levels of processing priority. Alternatively, a single queue could correspond to multiple levels of processing priority. For example, the high-priority frames HPD and the medium-priority frames MPD could be registered in the high-priority queue HPQ, and the low-priority frames MPD could be registered in the low-priority queue LPQ.

E. Embodiment 5

Figure 17:
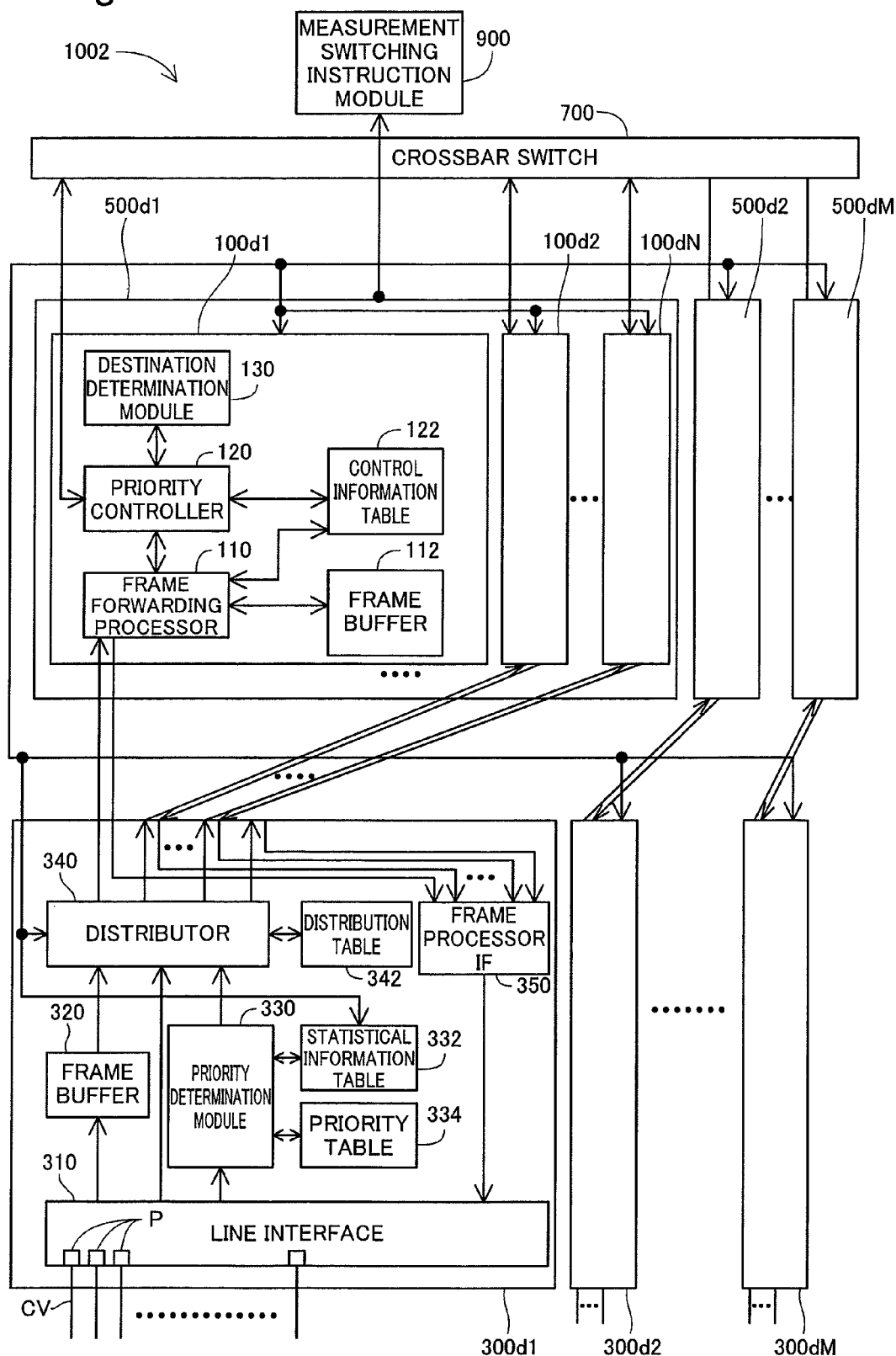
FIG. 17 is a illustration depicting another embodiment of a switching device.

FIG. 17 is an illustration depicting another embodiment of a switching device. This switching device 1002 is provided with a measurement switching instruction module 900, a crossbar switch 700, a number M (M is an integer at least 2) of frame processing systems 500d1 to 500dM, and a number M of network interfaces 300d1 to 300dM. The network interfaces 300d1 to 300dM are the same as those in the embodiment depicted in FIG. 2. The configurations of the frame processing systems 500d1 to 500dM are the same. Here, the suffix beginning with the letter "d" (e.g. "d1") of the reference characters for each of the frame processing systems 500d1 to 500dM is characters identifying the individual system. Hereinbelow, the identifying characters will be omitted in instances where there is no need to distinguish among individual systems.

The first frame processing system 500d1 includes a number N of frame processors 100d1 to 100dN. These frame processors 100d1 to 100dN are the same as those in the embodiment depicted in FIG. 2. In the present embodiment, the other frame processing systems 500d2 to 500dM also include a plurality of frame processors 100.

Each frame processing system 500 is connected to the crossbar switch 700. Each frame processing system 500 can communicate with any other frame processing system 500 through the crossbar switch 700.

In the present embodiment, a single network interface 300 will be connected to a single frame processing system 500. That is, a single frame processing system 500 receives frames from a single network interface 300. The frame processing system 500 identifies the destination physical port, and then identifies the frame processing system 500 connected to the network interface 300 including the destination physical port (hereinafter termed the "destination frame processing system"). In order to forward a frame, the frame processing system 500 sends a transmit instruction (including frame data and the destination physical port information) to the destination frame processing system. The destination frame processing system 500 then supplies the received transmit instruction to the network interface 300. In accordance with the received transmit instruction, the network interface 300 transmits the frame from the destination physical port.

In the present embodiment, a single frame processing system 500 includes multiple frame processors 100. Each frame processing system 500 independently switches its own power mode. Methods similar to those in the preceding embodiments (FIGS. 13 to 16) may be employed as the power mode switching method. By way of example, a case in which the method depicted in FIG. 13 is implemented in the present embodiment will be described. The N frame processors 100d1 to 100dN included in the first frame processing system 500d1 are grouped into two groups. In accordance with the conditions shown in FIG. 13, the measurement switching instruction module 900 transmits to each of the frame processors 100d1 to 100dN an instruction to change its operating mode. Similarly, the measurement switching instruction module 900 switches the distribution table 342 of the first network interface 300d1. Here, the plurality of physical ports P included in the first network interface 300d1 correspond to "target ports" relating to a set of the first frame processing system 500d1 and the first network interface 300d1. Concerning the other set of the processing system 500 and the network interface 300, configurations are similar to those of the above set. Note that the target ports may be part of the plurality of physical ports P included in the switching device 1002.

In this way, according to the present embodiment, forwarding processes are distributed among a plurality of frame processing systems 500, so forwarding process speed can be increased. Also, because the power mode of the frame processing systems 500 is switched in the same way as in the preceding embodiments, there will be similar advantages in the present embodiment as the above embodiments. The total number of frame processors 100 may differ between individual frame processing systems 500. Also, at least either one among the power mode configuration and the conditions for switching power mode may differ between individual frame processing systems 500. For some of the frame processing systems 500, the power mode may be fixed.

F. Embodiment 6

Figure 18:
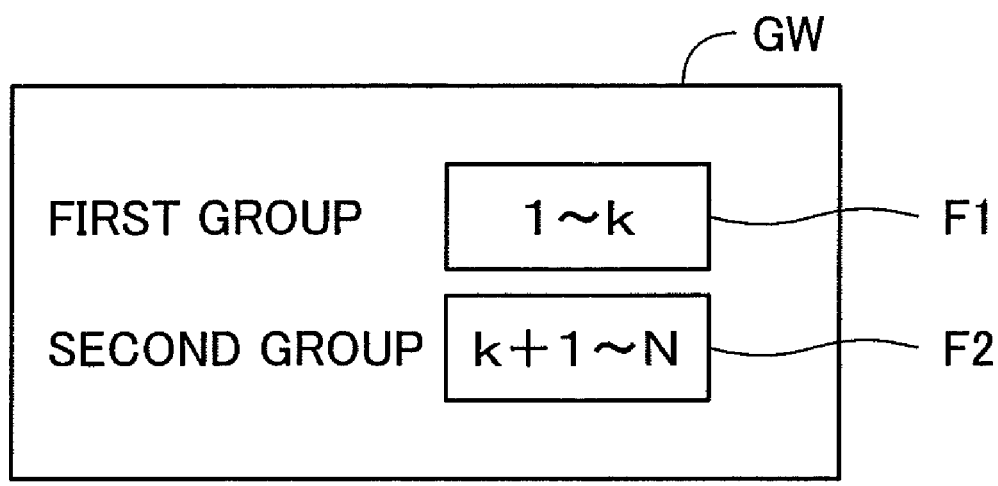
FIG. 18 is a illustration depicting a group settings screen GW.

In the preceding embodiments, the measurement switching instruction module 900 (FIG. 1, FIG. 2, FIG. 17) may also determine groups of the frame processors 100 in accordance with a user instruction (in this case, the measurement switching instruction module 900 will correspond to the "group determination module" in the claims). FIG. 18 is an illustration depicting a group settings screen GW. In accordance with a user instruction, the measurement switching instruction module 900 displays the group settings screen GW on an administrative terminal (not shown) connected to the switching device 1000, 1002.

The group settings screen GW is provided with a first field F1 for specifying members (frame processors 100) of the first group, and a second field F2 for specifying members of a second group. The user is able to specify the members of each group by operating the administrative terminal. As a result, the degree of freedom in controlling power consumption and reliability of data relay may be enhanced.

Also, three or more groups may be determined according to user instruction. In any event, the measurement switching instruction module 900 may determine all groups in accordance with a user instruction, or determine only some subset of groups in accordance with a user instruction. In the embodiment illustrated in FIG. 17, in preferred practice, the measurement switching instruction module 900 will preferably determine groups on an individual frame processing system 500 basis. The method by which the measurement switching instruction module 900 receives user instructions is discretionary. For example, the measurement switching instruction module 900 could receive user instructions from a control panel (not shown) provided to the switching device 1000, 1002.

G. Modified Embodiments

Apart from those elements that are claimed in independent claims, elements appearing in the preceding respective embodiments are optional elements and may be omitted where appropriate. The invention is not limited to the embodiments set forth hereinabove, and may be embodied with various modifications within its scope. It can be embodied according to the following modified embodiments, for example.

Modified Embodiment 1

In the preceding embodiments, any of various processors that controls packet forwarding among ports could be employed as the frame processors 100 (packet processors). Here, the term "port" is not limited to physical ports P, but is used in a broad sense to include the logical port. The logical port refers to a single virtual port obtained by aggregating a plurality of physical ports. Such the logical port may be configured through so-called link aggregation technology. In this case, any of various known processes could be used as the process for selecting a single physical port P for packet transmission from a single logical port. For example, a process of selecting a single physical port P according to a hash value obtained from header information could be employed. Such the process may be executed by the frame processor 100. Instead, such the process may be executed by the network interface 300.

Modified Embodiment 2

In the preceding embodiments, any information included in the header information of the packet may be used to determine the processing priority. For example, the priority determination module 330 (FIG. 2, FIG. 17) may determine the processing priority according to the Layer 4 destination port number (FIGS. 3F-3G). Also, the priority determination module 330 may use any information other than the header information to determine the processing priority. For example, the priority determination module 330 could determine the processing priority according to an identifier assigned to the physical port P that has received the frame. In any event, the priority determination module 330 may determine the processing priority according to conditions specified by the user. The total number of the processing priority levels may be any number at least 2.

Modified Embodiment 3

In the preceding embodiments, the measurement switching instruction module 900 (FIG. 2, FIG. 17) functions as an operating mode controller that controls the operating mode of the frame processor 100 according to the power mode. The frame processor 100 and the operating mode controller as a whole are considered to correspond to the "packet processor" in the claims. The measurement switching instruction module 900 is considered to include an assemblage of the operating mode controller of each frame processor 100. Also, each frame processor 100 could be provided with an operating mode controller respectively.

Also, in the preceding embodiments, the measurement switching instruction module 900 (FIG. 2, FIG. 17) functions as a selection controller that controls the distribution tables 342 (i.e. the groups for selecting the handling frame processor) according to the power mode. The distributor 340 and the selection controller as a whole are considered to correspond to the "distributor" in the claims. The measurement switching instruction module 900 is considered to include an assemblage of the selection controller of each distributor 340. Also, each distributor 340 could be provided with a selection controller respectively.

Modified Embodiment 4

In the preceding embodiments, various configurations could be employed as the power mode configuration. For example, in Embodiment 4 of FIG. 16, the following modification would be possible. Specifically, in the second power mode, the second group PG2, in addition to the third group PG3, could process the low-priority frames LPD. Further, in the third power mode, the second group PG2 could process the low-priority frames LPD in addition to the medium-priority frames MPD. Further, in the first power mode, the second group PG2, in addition to the first group PG1, could process the low-priority frames LPD. In this case, the third group PG3 will correspond to the "second group" in the claims. Here, in the first power mode, the first group PG1 may process the high-priority frames HPD and the medium-priority frames MPD, without processing the low-priority frames LPD.

In general, it will be preferable for the first and the second power modes to be utilizable in the following fashion. Specifically, in preferred practice, in both the first and the second power modes the distributor will select, from the first group, the handling packet processor for packets of a first priority having relatively high processing priority. Meanwhile, in the first power mode, in preferred practice, the packet processors of the second group will maintain their own operating mode in the first operating mode (the first operating mode relates to relatively low power consumption), and the distributor will select the packet processor assigned to handle packets of second priority from at least one group excluding the second group (the second priority corresponds to relatively low processing priority). Here, the at least one group excluding the second group may includes the first group, or instead excludes the first group. Also, the first priority may be lower than the highest priority level. In the second power mode on the other hand, in preferred practice, the packet processors of the second group will maintain their own operating mode in the second operating mode (the second operating mode relates to relatively high power consumption), and the distributor will select the packet processor assigned to handle packets of second priority from at least one group including the second group. Here, the at least one group including the second group may includes the first group, or instead excludes the first group. Any priority level lower than the first priority may be employed as the second priority. For example, the second priority could be higher than the lowest priority level.

Any of various methods could be employed as the method for implementing multiple operating modes having different levels of power consumption. For example, where the frame processor 100 operates synchronized to a clock signal, the clock frequency may be modified. Furthermore, the voltage of the power supplied to the frame processor 100 may be adjusted. The total number of operating modes is not limited to two, and it would be possible to employ any number at least 2. It would be possible to employ any mode as the operating mode of the first group irrespective of the operating mode of the second group. For example, in the second power mode, the operating mode of the first group may differ from the operating mode of the second group. Moreover, the operating mode of the first group may differ between in the first power mode and in the second power mode. Alternatively, the first group may operate in a predetermined operating mode in both the first power mode and the second power mode.

Further, various conditions may be employed as conditions for switching power modes. In general, it will be preferable to employ a condition designed to suppress problems with packet forwarding in relation to packets of relative high processing priority, as compared to relatively low processing priority. For example, it is assumed that in the first power mode, the first group processes both the first priority (high) and the second priority (low). In this case, any condition indicative of high load on the first group may be employed as the condition for switching the power mode from the first to the second mode (hereinafter termed the "step-up condition"). In preferred practice, the step-up condition will be designed so that the step-up condition will be satisfied while the load on the first group is still smaller than the maximum value of processing capability of the first group. Problems with forwarding of first priority packets can be suppressed thereby. Load herein is not limited to the number of frames received per unit of time, and various alternative values could be employed as the load. For example, the amount of received data per unit of time could be employed. Alternatively, a combination of received frames and received data amount could be employed.

When switching power modes, the distributor 340 (the measurement switching instruction module 900) may switch the candidates for the handling packet processor without waiting for completion of switching of the operating mode of the packet processors. Alternatively, the distributor 340 (the measurement switching instruction module 900) may switch the candidates after the switching is completed.

Any number of power modes including the first and the second power modes could be employed as available power modes. In any event, it will be possible to employ the following processes as power mode switching processes.

Step 1—Determine whether a condition for switching power mode is satisfied.
Step 2—If the condition is satisfied, switch the power mode.
Step 3—Return to Step 1.

Modified Embodiment 5

In the preceding embodiments, any method could be employed as the method for controlling the forwarding of the received packets while giving priority to the first priority over the second priority. For example, the weighted queuing (also known as custom queuing) could be employed. Other types of queuing methods may also be used. The total number of queue types is not limited to two, and any number could be employed. Here, the total number of processing priority levels may be different from the total number of queue types.

Modified Embodiment 6

In the preceding embodiments, the relay devices are not limited to so-called Layer 2 switches, and it would be possible to instead employ any relay devices that relay packets. For example, so-called Layer 3 switches could be used, or so-called routers could be used.

The configuration of the relay devices is not limited to that depicted in FIG. 1, FIG. 2 or FIG. 17, and any of various other configuration could be employed. For example, the total number of physical ports P may differ among individual network interfaces 300. The total number of physical ports P provided to one network interface 300 could be any number at least 1. The total number of groups of frame processors 100 (packet processors) is not limited to two or three, and any number at least 2 would be possible.

Modified Embodiment 7

In the preceding respective embodiments, some elements implemented through hardware could instead be implemented through software, and conversely some or all of the elements implemented through software could instead be implemented through hardware. For example, the function of the priority determination module 330 of FIG. 1 may be embodied in a computer which executes a program.

Where part or all of the functions of the invention are implemented through software, the software (computer program) for this purpose may be provided in a form stored on a computer-readable recording medium. In the invention, "computer-readable recording medium" is not limited to portable recording media such as flexible disks or CD-ROM, but also includes internal memory devices in a computer such as various types of RAM and ROM, as well as external storage devices attached to a computer, such as a hard disk.

Modified Embodiment 8

While various aspects of the invention are shown herein, there are other possible aspects such as the following.
Aspect2. The relay device in accordance with the first aspect wherein in the first power mode, the distributor selects the handling packet processor from at least one group including the first group for the second priority, and in the second power mode, the distributor selects the handling packet processor from at least one group excluding the first group for the second priority.

According to this arrangement, in the first power mode, the first group will be commonly selected for processing of the first priority and the second priority, and thus the total number of packet processors operating in the second operating mode can be reduced. Power consumption can be reduced as a result. Moreover, in the second power mode, the second group will be selected in place of the first group for processing the second priority, thus suppressing decline in reliability of data forwarding in relation to the first priority.

Aspect3. The relay device in accordance with aspect 2 wherein responsive to satisfaction of a condition for switching from the first power mode to the second power mode:

the packet processor of the second group switches the own operating mode from the first operating mode to the second operating mode; and the distributor selects the handling packet processor from among at least one group excluding the first group and including the second group for the second priority without waiting for completion of switching of the operating mode by the packet processor.

According to this arrangement, without waiting for switching of the operating mode of the second group to finish, the distributor will select a packet processor assigned to handle the second priority from among one or more groups inclusive of the second group but excluding the first group, thus suppressing decline in reliability of data forwarding in relation to the first priority.

Aspect4. The relay device in accordance with any one among aspects 1-3 wherein the packet processor gives priority to the first priority over the second priority to control the forwarding of the received packet.

According to this arrangement, the first priority is given priority, thus suppressing decline in reliability of data forwarding in relation to the first priority.

Aspect5. The relay device in accordance with any one among aspects 1-4, further comprising a group determination module that determines the first group and the second group according to an instruction by a user.

According to this arrangement, higher freedom of control of power consumption and reliability of data relay is afforded.

Aspect6. The relay device in accordance with any one among aspects 1-5 wherein in the first power mode, the distributor selects the handling packet processor from the first group for the second priority; and in the second power mode, the distributor selects the handling packet processor from the second group for the second priority.

According to this arrangement, power consumption and reliability of data relay can be controlled by utilizing two groups.

Aspect7. A method of controlling a relay device for relaying packets, wherein the relay device includes:

a plurality of ports configured to connect to lines, the plurality of ports including J (the number J is an integer at least 1) target ports utilized for forwarding according to priority;

a priority determination module that determines the priority for each of received packets received by the target ports, from among K (the number K is an integer at least 2) priority levels including a first priority and a second priority;

N (the number N is an integer at least 2) packet processors that control forwarding of the received packet among the ports; and a distributor that selects an handling packet processor to control forwarding of the received packet from among the N packet processors for each of the received packets, wherein the N packet processors are grouped into P (the number P is an integer at least 2) groups including a first group and a second group; and the method comprising:

operating in a first power mode at the relay device; and operating in a second power mode at the relay device, wherein the operating in the first power mode includes:

(A1) maintaining own operating mode in a first operating mode of relatively low power consumption, by each packet processor of the second group;

(A2) selecting the handling packet processor from the first group for the first priority, by the distributor; and (A3) selecting the handling packet processor from at least one group excluding the second group for the second priority, by the distributor, wherein the operating in the second power mode includes:

(B1) maintaining the own operating mode in a second operating mode of relatively high power consumption, by each packet processor of the second group;

(B2) selecting the handling packet processor from the first group for the first priority, by the distributor; and (B3) selecting the handling packet processor from at least one group including the second group for the second priority, by the distributor.

Although the present invention has been described and illustrated in detail, it is clearly understood that the same is by way of illustration and example only and is not to be taken by way of limitation, the spirit and scope of the present invention being limited only by the terms of the appended What is claimed is:

What is claimed is:

1. A relay device for relaying packets, comprising:
   a plurality of ports configured to connect to lines, the plurality of ports including J (the number J is an integer at least 1) target ports utilized for forwarding according to priority;
   a priority determination module that determines the priority for each of a plurality of received packets received by the target ports, from among K (the number K is an integer at least 2) priority levels including a first priority and a second priority;
   N (the number N is an integer at least 2) packet processors that control forwarding of the received packet among the ports; and
   a distributor that selects a handling packet processor to control forwarding of the received packet from among the N packet processors for each of the received packets, wherein
   the N packet processors are grouped into P (the number P is an integer at least 2) groups including a first group and a second group; and
   the relay device is configured to select a power mode of the relay device from among a plurality of power modes including a first power mode and a second power mode, wherein
   in the first power mode:
      each packet processor of the second group maintains own operating mode in a first operating mode of relatively low power consumption; and
      the distributor selects the handling packet processor from the first group for the first priority, and selects the handling packet processor from at least one group excluding the second group for the second priority, wherein
   in the second power mode:
      each packet processor of the second group maintains the own operating mode in a second operating mode of relatively high power consumption; and
      the distributor selects the handling packet processor from the first group for the first priority, and selects the handling packet processor from at least one group including the second group for the second priority.

2. The relay device in accordance with claim 1 wherein
   in the first power mode, the distributor selects the handling packet processor from at least one group including the first group for the second priority, and
   in the second power mode, the distributor selects the handling packet processor from at least one group excluding the first group for the second priority.

3. The relay device in accordance with claim 2 wherein
   responsive to satisfaction of a condition for switching from the first power mode to the second power mode:
      the packet processor of the second group switches the own operating mode from the first operating mode to the second operating mode; and
      the distributor selects the handling packet processor from among at least one group excluding the first group and including the second group for the second priority without waiting for completion of switching of the operating mode by the packet processor.

4. The relay device in accordance with claim 1 wherein
   the packet processor gives priority to the first priority over the second priority to control the forwarding of the received packet.

5. The relay device in accordance with claim 1, further comprising
   a group determination module that determines the first group and the second group according to an instruction by a user.

6. The relay device in accordance with claim 1 wherein
   in the first power mode, the distributor selects the handling packet processor from the first group for the second priority; and
   in the second power mode, the distributor selects the handling packet processor from the second group for the second priority.

7. A method of controlling a relay device for relaying packets,
   wherein the relay device includes:
      a plurality of ports configured to connect to lines, the plurality of ports including J (the number J is an integer at least 1) target ports utilized for forwarding according to priority;
      a priority determination module that determines the priority for each of received packets received by the target ports, from among K (the number K is an integer at least 2) priority levels including a first priority and a second priority;

N (the number N is an integer at least 2) packet processors that control forwarding of the received packet among the ports; and a distributor that selects an handling packet processor to control forwarding of the received packet from among the N packet processors for each of the received packets, wherein the N packet processors are grouped into P (the number P is an integer at least 2) groups including a first group and a second group; and the method comprising:

operating in a first power mode at the relay device; and operating in a second power mode at the relay device, wherein the operating in the first power mode includes:

(A1) maintaining own operating mode in a first operating mode of relatively low power consumption, by each packet processor of the second group;

(A2) selecting the handling packet processor from the first group for the first priority, by the distributor; and (A3) selecting the handling packet processor from at least one group excluding the second group for the second priority, by the distributor, wherein the operating in the second power mode includes:

(B1) maintaining the own operating mode in a second operating mode of relatively high power consumption, by each packet processor of the second group;

(B2) selecting the handling packet processor from the first group for the first priority, by the distributor; and (B3) selecting the handling packet processor from at least one group including the second group for the second priority, by the distributor.

8. The control method in accordance with claim 7 wherein
in the selecting (A3), the handling packet processor is selected from at least one group including the first group for the second priority, by the distributor; and
in the selecting (B3), the handling packet processor is selected from at least one group excluding the first group for the second priority, by the distributor.

9. The control method in accordance with claim 8 further comprising:
responsive to satisfaction of a condition for switching from the first power mode to the second power mode:
switching the own operating mode from the first operating mode to the second operating mode, by the packet processor of the second group; and
selecting the handling packet processor from among at least one group excluding the first group and including the second group for the second priority by the distributor, without waiting for completion of switching of the operating mode of the packet processor.

10. The control method in accordance with claim 7 further comprising:
giving priority to the first priority over the second priority to control the forwarding of the received packet, by the packet processor 11. The control method in accordance with claim 7 further comprising:
determining the first group and the second group according to an instruction from a user.

12. The control method in accordance with claim 7 wherein
in the selecting (A3), the handling packet processor is selected from the first group for the second priority, by the distributor; and
in the selecting (B3), the handling packet processor is selected from the second group for the second priority, by the distributor.

* * * * *